(12) United States Patent
Zhuang et al.

(10) Patent No.: US 11,425,549 B2
(45) Date of Patent: Aug. 23, 2022

(54) METHOD OF MANAGING SINGLE-HOP AND MULTI-HOP BROADCAST IN VEHICULAR COMMUNICATION NETWORKS AND DEVICE THEREFOR

(71) Applicants: Weihua Zhuang, Waterloo (CA); Hassan Aboubakr Omar, Kanata (CA)

(72) Inventors: Weihua Zhuang, Waterloo (CA); Hassan Aboubakr Omar, Kanata (CA)

( * ) Notice: Subject to any disclaimer, the term of this patent is extended or adjusted under 35 U.S.C. 154(b) by 232 days.

(21) Appl. No.: 16/626,499

(22) PCT Filed: Jul. 17, 2018

(86) PCT No.: PCT/CA2018/050863
§ 371 (c)(1),
(2) Date: Dec. 24, 2019

(87) PCT Pub. No.: WO2019/014758
PCT Pub. Date: Jan. 24, 2019

(65) Prior Publication Data
US 2020/0162878 A1 May 21, 2020

Related U.S. Application Data

(60) Provisional application No. 62/604,681, filed on Jul. 17, 2017.

(51) Int. Cl.
| | | |
|---|---|---|
| *H04W 4/90* | (2018.01) | |
| *H04W 72/04* | (2009.01) | |
| *H04W 4/06* | (2009.01) | |
| *H04W 76/10* | (2018.01) | |
| *H04J 3/16* | (2006.01) | |
| *H04J 3/06* | (2006.01) | |
| *H04W 4/40* | (2018.01) | |

(Continued)

(52) U.S. Cl.
CPC ............. *H04W 4/90* (2018.02); *H04J 3/0635* (2013.01); *H04J 3/1694* (2013.01); *H04W 4/06* (2013.01); *H04W 4/40* (2018.02); *H04W 72/0446* (2013.01); *H04W 76/10* (2018.02); *G01S 19/13* (2013.01); *H04W 4/80* (2018.02)

(58) Field of Classification Search
CPC ..... H04W 4/90; H04W 12/0446; H04W 4/06; H04W 4/80; H04W 76/10; H04W 4/40; H04J 3/0635
See application file for complete search history.

(56) References Cited

U.S. PATENT DOCUMENTS

| | | | | |
|---|---|---|---|---|
| 7,720,026 B2* | 5/2010 | Chen | ................. | H04L 29/12009 370/328 |
| 9,129,532 B2* | 9/2015 | Rubin | .................... | G08G 1/162 |
| 10,292,136 B2* | 5/2019 | Rubin | ................... | H04W 4/027 |

(Continued)

*Primary Examiner* — Muthuswamy G Manoharan

(57) ABSTRACT

In vehicular communication networks, reliable delivery of safety messages is crucial and any transmission collision is to be avoided. A method based on time division multiple access scheme is described. An extra layer is provided to manage and schedule transmission of safety messages. The extra, message broadcasting handling layer (MBH layer) is provided between safety applications and medium access control (MAC) layer. Safety messages generated and received from safety application is spooled in the MBH layer and scheduled by the MBH layer for delivery to the MAC layer for broadcasting. A device to implement the method is also described.

30 Claims, 13 Drawing Sheets

(51) Int. Cl.
*H04W 4/80* (2018.01)
*G01S 19/13* (2010.01)

(56) References Cited

U.S. PATENT DOCUMENTS

2009/0129364 A1* 5/2009 Lee .................... H04L 12/4015
370/345
2016/0295589 A1* 10/2016 Nikopour .............. H04W 4/023
2019/0124489 A1* 4/2019 Ahmad .................. H04W 4/40

* cited by examiner

| MPDU control | Tx node ID | Message ID | Tx slot | Tx frame | Slot bitmap | # one-hop neighbors | BSM |

(a) Main MPDU

| MPDU control | Tx node ID | Message ID | Tx slot | Tx frame | Source node ID | Safety message |

(b) Secondary MPDU

| MPDU type | BSM bit | Time-to-live |

(c) MPDU control field in the main and secondary MPDUs

FIG. 9

| Header field | | Length (bits) | Definition | MPDU |
|---|---|---|---|---|
| MPDU control | MPDU type | 1 | A bit that indicates whether the MPDU is main or secondary | Main and secondary |
| | BSM bit | 1 | A bit that indicates whether or not a BSM is included in a main MPDU | |
| | Time-to-live | $\lceil \log_2 H \rceil$ | The remaining number of hops the carried message needs to propagate | |
| Tx node ID | | 32 | The ID of the node that is transmitting the MPDU | |
| Message ID | | 8 | The ID of the message carried by the MPDU (if any) | |
| Tx slot | | $\lceil \log_2 S \rceil$ | The index of the slot over which the MPDU is transmitted | |
| Tx frame | | $\lceil \log_2 F \rceil$ | The index of the frame that includes the Tx slot | |
| Source node ID | | 32 | The ID of the node that generated the message carried by the MPDU | Secondary only |
| Slot bitmap | | $S$ | The slot bitmap of the transmitting node | Main only |
| # one-hop neighbors | | $\lceil \log_2 S \rceil$ | The number of one-hop neighbors, $\lvert N_x \rvert$, of the transmitting node, $x$ | |

FIG. 10

METHOD OF MANAGING SINGLE-HOP AND MULTI-HOP BROADCAST IN VEHICULAR COMMUNICATION NETWORKS AND DEVICE THEREFOR

FIELD OF INVENTION

The invention relates generally to the field of vehicular communications. In particular, the invention relates to method and device of managing single-hop and multi-hop broadcasting of messages in vehicular communication networks and device for implementing the method.

BACKGROUND OF INVENTION

Road accidents represent a serious public problem and are one of the leading causes of people death and disability in many countries. To reduce the risk and severity of a vehicle crash on road, wireless communications can be employed among vehicles moving in the vicinity of each other, so that they may be made aware of surroundings and react accordingly. It is important that each node (e.g., a vehicle) broadcasts safety messages to all the surrounding nodes reliably.

There have been proposals of providing (standardized) vehicular network architecture for establishing wireless communications among vehicles in a distributed manner (i.e., without the need of any central controller). Such architecture is typically in layers and will include at least an application layer that generates safety messages, such as that defined in the SAE J2735 standard. The safety message application layer generates different types of safety messages, including basic safety messages (BSM) and may therefore be referred to as BSM layer. In an IEEE network architecture, below the BSM layer is the layer that runs the WAVE short message protocol (WSMP), which is considered more suitable to support networking services for safety applications, as compared to UDP/TCP over IP.

Conventionally, the message transmission operates over the 5.9 GHz dedicated short range communications (DSRC) spectrum, which is divided into seven 10 MHz channels. Safety messages are generated at BSM layer and delivered to medium access control (MAC) layer for transmission. Each node has a transceiver that is always tuned to a safety channel, over which the safety message broadcast by each node takes place. Using a dedicated transceiver for safety message broadcast and on a fixed channel is generally recommended, for its superior performance, in terms of message error rate and inter-message receiving delay, as compared to other channel switching techniques.

When a node, x, broadcasts a safety message, unless a transmission collision happens, it is assumed that the message is successfully delivered to each node whose distance from node x is less than or equal to a specified threshold, denoted by $\zeta_x$. On the other hand, all the nodes that are separated from node x by a distance greater than $\zeta_x$ cannot receive any message broadcast by node x. For all safety message broadcasts, all the nodes use the same transmit power level and physical layer data rate (i.e., modulation and coding scheme (MCS)). Hence, the distance threshold, $\zeta_x$, is reasonably considered fixed and similar for each node, x, and is denoted by $\zeta$. In a vehicular environment, distances among vehicles change and therefore the broadcast neighborhood of each node dynamically changes due to vehicle mobility. Transmission collisions may thus be introduced by vehicle mobility, and may prevent all nodes from receiving successfully safety messages transmitted by nodes in the neighborhood. This is a potential safety risk.

There have been proposals of avoiding transmission collision using time division multiple access (TDMA) scheme for broadcasting safety messages. The TDMA protocols proposed for vehicular networks would require each node to broadcast over one of its time slots, once per frame, the ID of each one-hop neighbor that accessed any time slot in the previous (sliding) frame. This periodic broadcast of the one-hop neighbor IDs in each frame results in a considerable amount of overhead information, especially in high vehicle density scenarios. Also, even though the main advantage of the TDMA proposal resides in the reliable broadcast service, which is useful primarily for safety applications, the TDMA will be required to be applied to all type of application messages. Additionally, the proposed TDMA solutions require replacing a standardized MAC protocol, e.g., IEEE 802.11p MAC, with a TDMA MAC scheme, and consequently are not compatible with current vehicular network architectures. Hence, the proposed TDMA solutions are not ideal due to the overhead introduced, the lack of flexibility, and the non-compatibility with current vehicular network architectures.

The forgoing creates challenges and constraints for establishing and maintaining reliable vehicular communications among nodes. There is therefore a need for a method and system of managing the broadcasting of messages for vehicular communications in order to reliably deliver safety messages to all neighboring nodes, avoid potential transmission collisions. It is an object of the present invention to mitigate or obviate at least one of the above mentioned disadvantages.

SUMMARY OF INVENTION

The invention relates to a method and device of managing broadcasting of safety messages by a plurality of nodes in a broadcast neighborhood communicating with each other in a vehicular communication network. Each of the nodes periodically broadcasts messages to other nodes.

According to one aspect of the invention, the method comprises, at a node of the plurality of nodes, establishing a time division scheme common to all nodes in the broadcast neighborhood for broadcasting messages, the time division scheme partitioning time into time frames and dividing each of the time frames into time slots, and performing the steps of:

receiving application messages from one or more application modules executing at the node, the application messages including safety messages and non-safety messages, receiving safety messages from all other nodes in the broadcast neighborhood, providing a first module and a second module, the second module receiving safety messages from the application module and other nodes and managing broadcasting of safety messages, the first module receiving and managing broadcasting of non-safety messages bypassed the second module and passing all messages to a transceiver to broadcast, the second module, to manage broadcasting of one or more safety messages of the node in a time frame, the one or more safety messages including at least a primary safety message, spooling the one or more safety messages at the node, acquiring a main time slot for the primary safety message in the time frame, determining if the one or more safety messages including at least one secondary safety message, and acquiring at least one secondary time slot in the time frame corresponding to the least one secondary safety message upon affirming presence of the at least one secondary safety message in the one or more safety messages, delivering the primary safety message at the beginning of the main time slot to the first module for broadcasting, the first module forwarding the primary safety messages to the transceiver to broadcast, delivering each of the at least one secondary safety message at the beginning of respective corresponding at least one secondary time slot to the first module for broadcasting, the first module forwarding each of the least one secondary safety message to the transceiver to broadcast, recording time slots used by the safety messages received from all other nodes in the broadcast neighborhood, updating time slot usage in the time frame by all nodes in the broadcast neighborhood according to the main time slot and the at least one secondary time slot used by the node and the time slots used by the all other nodes, and storing the updated time slot usage by all the nodes at the node.

According to one feature of this aspect of the invention, the first module is a medium access control (MAC) layer module and the second module is a message broadcast handling (MBH) layer module. According to another feature of this aspect of the invention, the primary safety message is a basic safety message (BSM). According to yet another feature of this aspect of the invention, the secondary safety message is a non-BSM message.

According to yet another feature of this aspect of the invention, the step of either or both of acquiring the main time slot and acquiring the at least one secondary time slot include the steps of: identifying a time slot unallocated to any other nodes in the broadcast neighborhood, granting the node access to the unallocated time slot, detecting if the granted time slot being accessed by multiple nodes, and identifying another time slot and granting the node access to the other time slot if multiple access is detected.

As a further feature, the updated time slot usage is stored in a matrix at the node, using intersection of a row and a column in the matrix to record time slot usage as determined by a one-hop neighbor node, wherein rows in the matrix correspond to one-hop neighbor nodes of the node and columns in the matrix correspond to time slots, and wherein the unallocated time slot is identified by identifying a column in the matrix that has no cell indicating usage by any node in the broadcast neighborhood.

As an even further feature, the method includes the further steps of: receiving a bitmap from each of the node's one-hop neighbor nodes, where each bitmap received by the node from a one-hop neighbor node, y, is storing time slot usage by one-hop neighbor nodes of the one-hop neighbor node y, for each of the node's one-hop neighbor nodes, and for each of S time slots in a sliding time window consisting of S consecutive time slots preceding and including the time slot, evaluating the bitmap corresponding to the one-hop neighbor node in the time slot and marking the time slot as busy if used in the bitmap, and updating each cell of the matrix as busy or not busy using the bitmaps received from all of the node's one-hop neighbor nodes.

As yet another feature of this aspect of the invention, the updated time slot usage by all one-hop neighbors is stored in a bitmap at the node, the bitmap being updated after expiry of each time slot, k, to record whether or not each time slot in a sliding time window that consists of S consecutive time slots preceding and including time slot k is used by a one-hop neighbor for transmission, where k=0, . . . , S−1, and S being the total number of time slots in a frame. As a further feature, the bitmap stored at the node is included in a main MPDU transmitted by the node over its main time slot, regardless whether or not the main MPDU is carrying a primary safety message. Additionally, the primary safety message transmitted may include number of one-hop neighbors of the node in a header portion of the main MPDU carrying the primary safety message.

As yet another feature of this aspect of the invention, the method further includes the steps of: identifying from the safety messages received from the other nodes multi-hop safety messages to be relayed by the node, acquiring additional secondary time slots for the multi-hop safety messages to be relayed, and including the multi-hop safety messages to be relayed in the at least one or more secondary safety messages and including the additional secondary time slots in the corresponding at least one secondary time slots. Here, delivering of the each of the at least one secondary safety message includes delivering the multi-hop safety messages to be relayed included in the at least one or more secondary MPDUs.

As a further feature, each of the safety messages received from another node includes a counter, the counter being reduced by a constant number each time the each safety message is relayed and the relayed safety message is no longer included in the multi-hop safety messages to be relayed upon the counter being reduced to below a threshold.

According to another aspect of the invention, there is provided a device for managing broadcasting of safety messages by a node communicating with a plurality of other nodes in a broadcast neighborhood communicating with each other in a vehicular communication network, where each of the node and the plurality of other nodes periodically broadcast messages to other nodes. The device comprises a wireless transceiver connected to an antenna for broadcasting and receiving messages, a timing unit for receiving time synchronization reference signals, one or more microprocessors including a first microprocessor having a timer and having executing on the one or more microprocessors: a message broadcast handling (MBH) layer module executing on the first microprocessor, an application module, and a medium access control (MAC) module in data communication with the MBH module and the transceiver and forwarding messages from the MBH module to the wireless transceiver for broadcasting, and at least one memory device having stored thereon programming instructions to direct the one or more microprocessors to execute the MBH module, the application module, and the MAC module.

The MBH layer module receives the time synchronization reference signals from the timing unit and timer signals from the timer to establish a time division scheme, which partitions time into time frames and divides each of the time frames into time slots, and receives safety messages from the application module for spooling and broadcasting. The application module receives safety signals from at least one signal sensors and generates one or more safety messages in a time frame for broadcasting in accordance with the safety signals received from the at least one signal sensors, the one or more safety messages including at least a primary safety message.

When the MBH layer module is executing on the first microprocessor, it causes the performance of the steps of: spooling the one or more safety messages at the node by storing the one or more safety messages temporarily on the at least one memory device, acquiring a main time slot for the primary safety message in the time frame, determining if the one or more safety messages including at least one secondary safety message, and acquiring at least one secondary time slot in the time frame corresponding to the at least one secondary safety message upon affirming presence of the at least one secondary safety message in the one or more safety messages, delivering the primary safety message at the beginning of the main time slot to the MAC layer for forwarding to the wireless transceiver broadcasting, delivering each of the at least one secondary safety message at the beginning of respective corresponding at least one secondary time slot to the MAC layer for forwarding to the wireless transceiver broadcasting, recording time slots used by the safety messages broadcast by all other nodes in the broadcast neighborhood, updating time slot usage in the time frame by all nodes in the broadcast neighborhood according to the main time slot and the at least one secondary time slot used by the node and the time slots used by the all other nodes, and storing in the one or more memory device the updated time slot usage by all the nodes at the node.

As a feature of this aspect of the invention, the duration of each time slot established by the MBH module is longer than duration required for transmission of any one of the safety messages. As another feature of this aspect of the invention, the timing unit is a GPS receiver and the time synchronization reference signals is a timing signal received by the GPS receiver from one or more satellites in a Global Positioning System (GPS).

As yet another feature of this aspect of the invention, the device includes additionally a matrix stored in the one or more memory device, the intersection of a row and a column in the matrix storing an indication of time slot usage by a node in the broadcast neighborhood. The MBH layer module acquires the main time slot and the at least one secondary time slot uses the matrix to first identify an unallocated time by identifying a column in the matrix that has no cell indicating usage by any node and granting the node access to the unallocated time slot.

In other aspects the invention provides various combinations and subsets of the aspects described above.

BRIEF DESCRIPTION OF DRAWINGS

For the purposes of description, but not of limitation, the foregoing and other aspects of the invention are explained in greater detail with reference to the accompanying drawings, in which:

FIG. 9 illustrates examples of structure and format of example of structure or format for holding values of MBH layer protocol data units (MPDUs);

FIG. 10 is a table showing the definition and length of each field in the main and secondary MPDU headers;

DETAILED DESCRIPTION OF EMBODIMENTS

Figure 1:
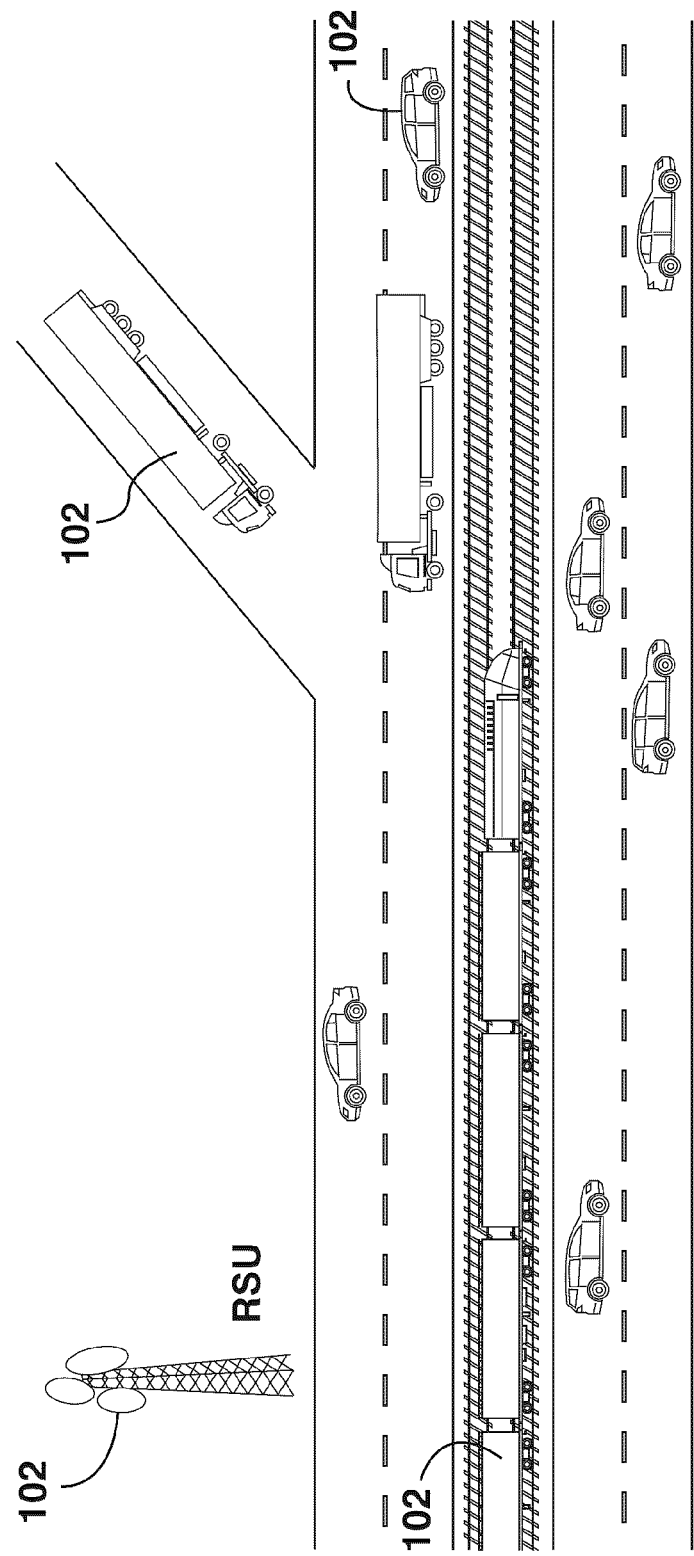
FIG. 1 is a diagram showing a plurality of nodes communicating with each other according to an embodiment of the present invention.

The description which follows and the embodiments described therein are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

In a vehicular ad hoc network, vehicles communicate either with each other via vehicle-to-vehicle communication or with stationary road side infrastructure or road side units ("RSU") via vehicle-to-infrastructure communication, to exchange information generated by on-board mobile applications. It is essential that these nodes all reliably broadcast safety message packets to their neighbors and receive safety message packets from their respective source nodes. Here, "nodes" include both vehicles and RSUs for relaying vehicular messages.

FIG. 1 illustrates schematically a plurality of nodes 102, such as vehicles and RSUs, communicating with each other in a communication network. Such communication may be wireless vehicular communications in a vehicular ad hoc network. Here, "vehicle" shall mean a movable object for carrying load, whether self-propelled or driven by another self-propelled moving object, and may include road vehicles such as automobiles, buses, transportation trucks, trailers or other heavy good vehicles, railroad vehicles such as trains or individual cars of a train, aerial vehicles such as passenger airplanes, helicopters, unmanned aerial vehicles (UAVs), or ships, boats, underwater vehicles such as submarines, among others. The term "vehicular communications" includes both vehicle-to-vehicle communications, i.e., communications between and among vehicles, and vehicle-to-infrastructure communications, i.e., communications between vehicles and stationary road side infrastructure or road-side-units. The vehicular communications are wireless, which may be by way of radio signals, infra-red signals, microwave signals, optical or ultra-violet signals, sound signals, among others.

Figure 2:
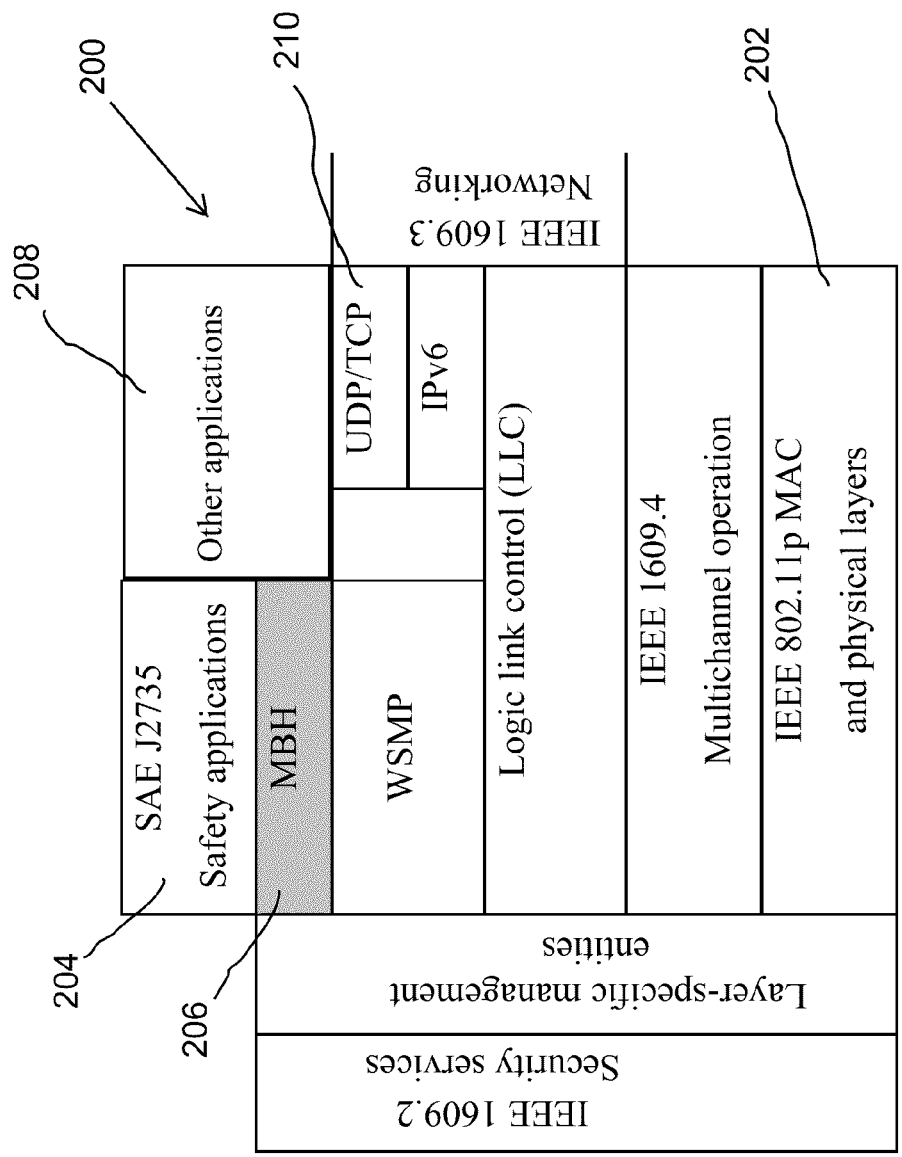
FIG. 2 shows an example of protocol stack according to a network architecture to implement the method described herein.

Vehicular communications in such a communication network typically is established according to a network architecture that includes a media access control ("MAC") protocol. The MAC protocol may be implemented in an MAC layer, below the application layer in a stack, such that safety messages generated in or by the application layer are pushed down in the stack to the MAC layer for managing the transmission or broadcasting through a lower physical layer. FIG. 2 shows an example of a protocol stack 200, modified from a protocol stack of a network architecture proposed in the IEEE 1609/802.11p standard. The network architecture 200 mainly consists of a number of stacked layers. Each layer represents a collection of functions, which aim at providing services to the layer above and exploiting the services provided by the layer below. The functionalities of each layer are performed by a set of entities, e.g., software or hardware modules, which communicate with the entities of the layers located directly above/below in the network architecture. It should be noted, though, that although references are frequently made to the IEEE 1609/802.11p protocol stack, popular in North America, what is described herein can be similarly applied to the European and Japanese protocol stacks, developed respectively by the European Telecommunications Standards Institute (ETSI) and the Association of Radio Industries and Businesses (ARIB), or any other suitable protocol stacks.

Referring to FIG. 2, the MAC layer 202 is at the bottom of the stack 200 and a safety application layer 204 is located at the top of the stack 200. An extra layer, namely, a message broadcast handling layer 206 (or MBH layer), runs at the top of stack 200, just below the safety application layer 204, which may be a BSM layer. Application messages generated by application layer 204 are safety related and will be referred to as safety messages. Safety messages will need to be broadcast to all other nodes within a safety range or distance. Safety messages generated by safety applications running in the safety application layer 204 do not get pushed down the stack to the MAC layer 202 immediately for broadcasting, but rather are spooled or buffered in the MBH layer 206 and delivered to the MAC layer 202 according to a timing management scheme, to avoid transmission collision.

The MAC protocol generally runs in the MAC layer 202, which generally manages the broadcasting of all messages, including safety messages. However, as will be further described below, according to the present invention, the MBH layer 206 is responsible for the management or scheduling of broadcasting of safety messages, by controlling the arrival time of a safety message from the safety application layer to the MAC layer. Other non-safety applications can possibly bypass the MBH layer, i.e., avoid using the MBH layer services. The protocol stack 200 may include layers of other applications 208 which generate other application messages, i.e., non-safety messages, and also other additional operation layers or functional layers 210, such as WSMP layer, UDP/TCP layer, Logic link control (LLC) layer, among others, to implement the operation and functionality of a particular standard for vehicular wireless communication, such as IEEE 1609/802.11p standard. A physical layer having direct control over a transceiver may be interfaced with or included in the MAC layer 202 (how these two layers are divided or delineated depends on each standard or network architecture and is to a greater degree conceptual), so that messages passed to MAC layer can be passed to the transceiver for transmission and messages received by the transceiver can be passed back to the MAC layer and further passed to other layers in the stack for processing.

Figure 3:
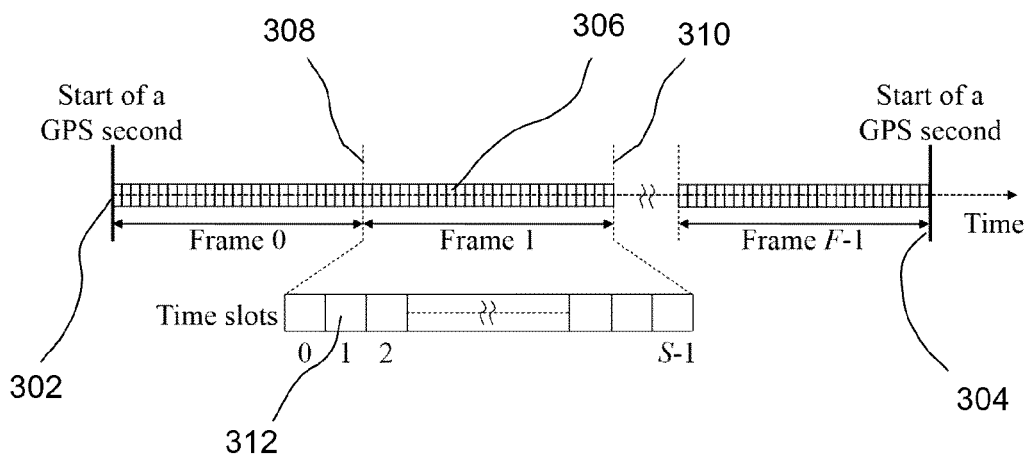
FIG. 3 provides an illustrative example, showing a time division scheme that may be employed by the nodes.

In time division channel access techniques, each unit time, between the start of the time unit 302 and the end of the time unit 304 (the same as the start of the next time unit), is partitioned into time frames 306 and each time frame, between the start time 308 of the frame and the end time 310 of the frame (or the beginning of the next frame), is further partitioned into a plurality of time slots 312, which may be indexed, such as 0, 1, 2, 3, . . . , S−1, as indicated in FIG. 3. Each time slot may be of a constant time interval, though this is for convenience only and not required. Each frame may by convention consist of a fixed number of time slots, denoted by S, as illustrated in FIG. 3. The beginning of a time frame may be defined with reference to an external timing signal, such as a Global Positioning System (GPS) signal. By synchronizing to a common external timing signal, i.e., time reference, the time division scheme so established will be common to all nodes synchronized to the time reference, and thus they will all share a common time division scheme. The time division scheme described in reference to FIG. 3 is utilized to manage the broadcasting of safety messages by the MBH layer. The MBH layer controls the time instant that a safety message generated by the application layer arrives to the underlying protocol stack to be broadcast over the air. By carefully controlling this arrival time, as will be further explained, the safety message transmissions by each node and its broadcast neighborhood can be achieved in a time division manner, thus avoiding transmission collisions, even with a contention-based MAC, such as the IEEE 802.11p MAC. In other words, referring to FIG. 2, the MBH layer realizes a TDMA scheme for broadcasting safety messages, by controlling the arrival time of safety messages from the application layer to the WSMP entity, rather than directly controlling the channel access time based on a TDMA MAC layer. The MAC layer will simply pass safety messages from the MBH layer to the underlying transceiver for broadcasting without, for example, managing the timing of the safety messages from the MBH layer, and will manage the broadcasting of only non-safety messages that have bypassed the MBH layer.

For the purpose of time slot allocation, each node x must keep a slot bitmap, $B_x(i)$, $i=0, \ldots, S-1$, indicating the status of each time slot i in a frame, as seen by node x in the previous S time slots. That is, $B_x(i)=1$ if node x has received or transmitted an MPDU over time slot i in the previous S time slots, and $B_x(i)=0$ otherwise. Here, the term "bitmap" is a shorthand for data arranged in a bitmap-like data structure, or the bitmap data structure itself, as will be clear from the context or indicated otherwise.

Figure 4:
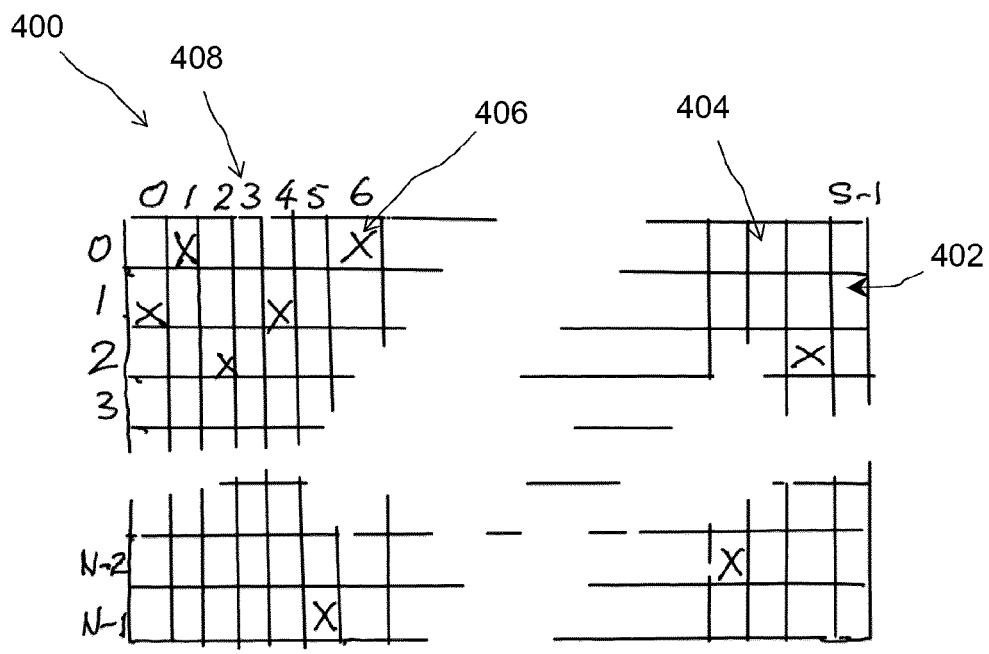
FIG. 4 shows a matrix for storing time slot usage information and for identifying if a time slot is not accessed by other nodes in its broadcast neighborhood.

FIG. 4 illustrates how a node x may determine if a time slot is not accessed by other nodes in its broadcast neighborhood. A matrix 400 consists of rows 402, each row corresponding to a bitmap received by node x from a one-hop neighbor node 102, and columns 404, each column corresponding to a time slot 312. For example, row 0 corresponds to the bitmap received by node x from the first node, row 1 corresponds to the bitmap received from the second node, so on and so forth, when N one-hop neighbor nodes are indexed from 0 to N−1. Similarly, column 0 corresponds to the first time slot, column 1 corresponds to the second time slot, so on and so forth, when S time slots are indexed from 0 to S−1. Thus, the intersection 406 of row 0 and column 6 will correspond to the usage of time slot 6 as determined by one-hop neighbor node 0. In the example, a cross ("X") is placed in this intersection, indicating that this time slot is seen by node 0 as busy in a sliding time window containing time slot 6, i.e., node 0 has received or transmitted an MPDU over time slot 6. Here, the sliding time window has S consecutive time slots preceding (and including) the time slot over which the bitmap is received by node x from node 0. To determine if a cell, i.e., the intersection corresponding to a one-hop neighbor node y at a time lot, is busy, the node x receives a bitmap from each of the node's one-hop neighbor nodes, where each bitmap received by the node from a one-hop neighbor node, y, is storing time slot usage by one-hop neighbor nodes of the one-hop neighbor node y. For each of the node's one-hop neighbor nodes, and for each of S time slots in the sliding time window, the node x evaluates the bitmap corresponding to the one-hop neighbor node y in the time slot and marking the time slot as busy if used in the bitmap, or as idle if otherwise. This information, i.e., whether the cell was "busy" or "idle" is updated for all cells or intersections using the bitmaps received from all of the node's one-hop neighbor nodes.

On the other hand, the intersection of row 0 and column 0 is empty, with no X placed in the intersection. This indicates that node 0 determines that time slot 0 is idle, i.e., node 0 has not received or transmitted an MPDU over time slot 0 in the sliding time window containing time slot 0, i.e., not in any time slot in the S time slots preceding (and including) the time slot over which the bitmap is received by node x from node 0. Further, as shown in this example, column 3 (so is column 5) is entirely empty, indicating that this time slot is determined as idle by all the one-hop neighbors of node x, and therefore is an available time slot 408, or an unallocated time slot, since it is not used by any node member of node x broadcast neighborhood. Here, the term "matrix" is a shorthand for data arranged in a data structure that takes the form of a matrix, or the matrix data structure itself, as will be clear from the context or indicated otherwise.

Figure 5:
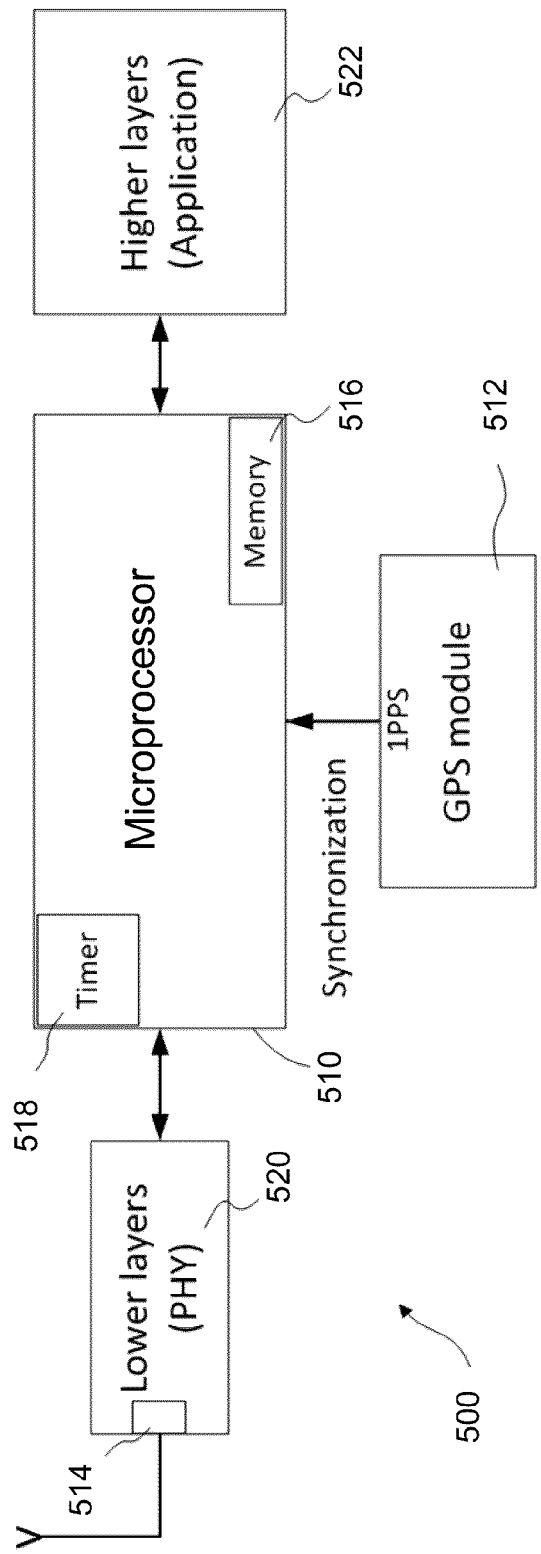
FIG. 5 is a diagram that illustrates in a block diagram the general configuration of an on-board communication device.

Such a protocol stack 200 and the time division scheme may be implemented by an on-board device 500. FIG. 5 is a diagram that illustrates in a block diagram the general configuration of an on-board communication device 500 for establishing and maintaining vehicular communications that implements the method described herein. The device 500 has a microprocessor 510, a timing signal receiver 512 and a wireless signal transceiver 514. The timing signal receiver 512 is interfaced with and providing external time synchronization signals to the microprocessor 510. The wireless signal transceiver receives and transmits wireless communication signals over the vehicular communication network to communicate with surrounding nodes (such as vehicles and RSUs), as directed by the microprocessor 510. The device is connected to various sensors, including safety sensors, and other signal inputs so that the microprocessor 510, as programmed, can receive safety messages from another application layer processor. This application layer processor collects the reading from the vehicle sensors and constructs the BSMs and other types of safety messages, which are passed to the microprocessor 510 for broadcast to neighboring nodes via the wireless signal transceiver. In a different architecture, without an application layer processor, it is possible that the microprocessor 510 conducts the application layer functionality of collecting readings from vehicle sensors and constructing the different types of messages for broadcast.

The microprocessor 510 may be any microprocessor that is configurable, i.e., programmable. The microprocessor 510 may be configured with instructions, i.e., a series of programmed steps or functions. The instructions may be stored on a memory device 516 of the microprocessor 510. When the instructions are executed by the microprocessor, it will cause the programmed functions to be performed. The memory device 516 also can be used for storing the slot usage bitmap 400 or to spool, i.e., temporarily store, safety messages for the MBH layer 206 while it schedules the broadcasting of the safety messages.

Microprocessor 510 may have both timer and external interrupt capabilities, i.e., is both timer interruptible and externally interruptible. It may be interrupted when clock counts of an internal clock or timer 518 reaches a threshold value. It may also be interrupted, for example, by a rising edge of timing signals received from the timing signal receiver 512.

The timing signal receiver 512 receives an external time reference signal and provides successive timing markers contained in the external time reference signal to the microprocessor 510 for time synchronization. The timing signal receiver 512 may be a GPS receiver (as indicated in FIG. 5) that receives GPS signals as the external time reference signal.

In addition to microprocessor 510, timing signal receiver 512 and wireless signal transceiver 514 of device 500, device 500 may also include a physical layer (PHY) processor 520 (or physical layer message module). The physical layer 520 is interfaced with the wireless signal transceiver 514 and the microprocessor 510 for processing messages, such as safety messages. The safety messages may be that of other nodes and received for relaying. The safety messages also may be that generated by the node's on-board unit or units, which are subsequently processed by physical layer 520 and packaged into suitable format for transmission by the wireless signal transceiver 514.

The physical layer 520 is mainly responsible for processing physical layer tasks, such as channel coding, carrier modulation, pulse shaping, power amplification, signal filtering, and multiple-input-multiple-output (MIMO) functionalities. For example, physical layer 520 may package a safety message (received from microprocessor 510) into a suitable format according to a communication protocol adopted by the transceiver 514 and forward the packaged safety message to the transceiver 514 for broadcasting. The physical layer 520 is considered as a layer that the MAC layer may access. Of course, while the physical layer 520 may have its own microprocessor, the functionality of the physical layer also may be provided by the microprocessor 510.

To successfully broadcast safety messages, when a safety message is generated by the safety application layer 204 of a node, the message is delivered to the underlying IEEE 1609/802.11p protocol stack only at the "start" of an available time slot 408 that has been reserved by the node. In this way, the message reaches the node's MAC layer 202, contends for the channel using the standard IEEE 802.11p distributed coordination function (DCF), and gets broadcast over the air without any transmission collision, because no other nodes within the node's broadcast neighborhood is simultaneously contending the same time slot for broadcasting. Thus, the function of the MBH layer 206 is to spool the safety messages (i.e., temporarily storing the safety messages from the application layer in a memory unit of the on-board system), find and reserve time slots not allocated to other nodes for broadcast of safety messages, and deliver the node's safety messages (i.e., either the node's own safety messages generated by its on-board unit or other nodes' safety messages that the node is relaying) to the MAC layer for broadcasting at the start of the respective reserved time slots, and meanwhile keep records of time slots used by other nodes and update this information for use by the node itself and its neighbors for time slot allocation. This is further illustrated in FIG. 6.

Figure 6:
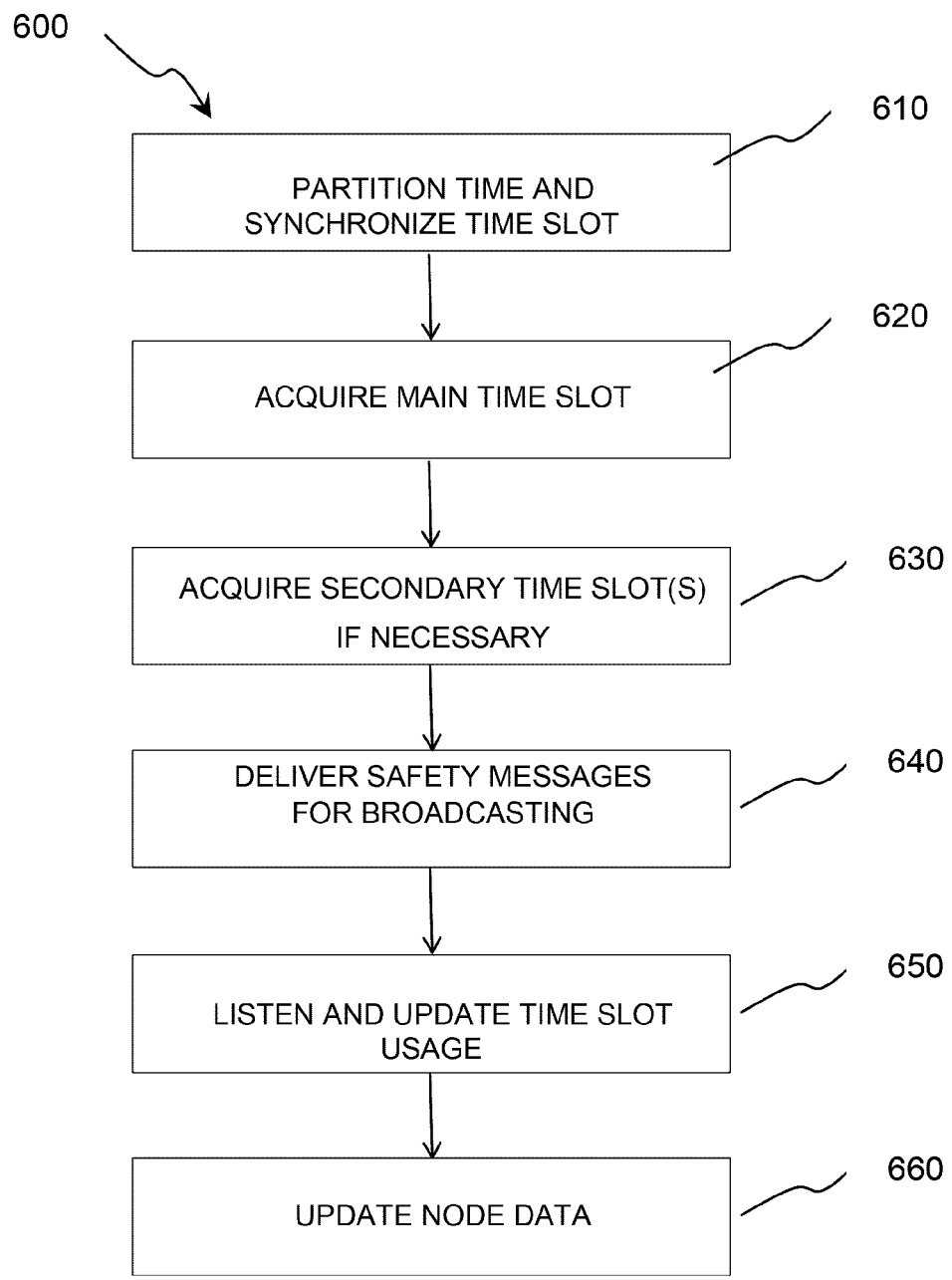
FIG. 6 is a flow diagram showing the steps of a method of managing broadcast of safety messages.

Reference is now made to FIG. 6. At the start of the process, each node will first partition a time unit into time frames which is further divided into time slots, and will also synchronize these time frames (or time slots) to an external time reference source common to all nodes, such as GPS signals (step 610).

Each node will allocate time slots for broadcasting its safety messages. There are two types of time slots corresponding to two categories of safety messages. These safety messages may be generated in the safety application layer or module or received wirelessly from neighboring nodes by the wireless transceiver. Each node must acquire a time slot, referred to as the node's main slot (step 620), which is periodically accessed by the node in each time frame. The main slot is used by the node to broadcast a BSM and exchange control information necessary for the MBH layer functionalities. The control information is included in the header of the MPDU transmitted over the main slot, which is referred to as the main MPDU. Since the main MPDU carries control information that should be continuously exchanged among nodes, it is broadcast over the node's main slot, even if there is no BSM awaiting for transmission.

In addition to BSMs and control information in the main MPDU, the node's application layer also generates other types of safety messages, such as signal phase and timing (SPAT) and emergency vehicle alert (EVA) messages. A node also may relay safety messages received from another node that require multi-hop broadcast. These other safety messages are included in a secondary MPDU that contains less control information in its header as compared to the main MPDU. The node therefore also may need to acquire one or more secondary time slots for transmitting these secondary safety messages (step 630). That is, the node also may need to find one or more unallocated time slots 408 and reserve them for transmitting these secondary safety messages. The bitmap 400 illustrated in FIG. 4 may be used for identifying all unallocated time slots 408, and then the node can reserve one or more unallocated time slots as needed for use by the node.

Next, the main MPDU and the secondary MPDUs, if any, are delivered (step 640) to the MAC layer 202 at the beginning of their respective reserved time slots for broadcasting, after being properly prepared.

Meanwhile, at each time slot, the node continuously listens in the dedicated safety message channel, such as one of the seven dedicated 10 MHz channels in the 5.9 GHz DSRC spectrum, for safety messages from all other nodes in the neighborhood and update the time slot usage information (step 650). If a safety message is received in that time slot, the time slot is marked, i.e., recorded, as being used by the one-hop neighbor node from which the safety message is received. If a time slot was marked as being used in the previous time frame but no safety message is received in the current time frame, the mark is also cleared to note the release of the time slot. This may happen, for example, where there was transmission collision and the time slot has been released by one of the competing nodes and the other node has left the one-hop neighborhood.

Here, a one-hop neighbor node means a node from which broadcast messages may be received directly without relay by any other nodes. As described earlier, when a node, x, broadcasts a safety message, unless a transmission collision happens, it is assumed that the message is successfully delivered to each node whose distance from node x is less than or equal to a specified threshold, $\zeta_x$. All nodes that are separated from node x by a distance greater than $\zeta_x$ are assumed to be not able to receive any message broadcast by node x. For all safety message broadcasts, all the nodes use the same transmit power level and physical layer data rate (i.e., modulation and coding scheme (MCS)), as specified by the MBH layer. The distance threshold, $\zeta_x$, is reasonably considered fixed and similar for each node, x, and may be simply denoted by $\zeta$.

The following definitions will be used when referring to "one-hop neighbors", "two-hop neighbors", and "broadcast neighborhood":

One-hop neighbors: Two nodes, x and y, are referred to as one-hop neighbors if the distance between x and y is less than or equal to $\zeta$. Two nodes are one-hop neighbors iff they can directly exchange safety messages.

Two-hop neighbors: Two nodes, x and y, are referred to as two-hop neighbors if they are not one-hop neighbors and there exist at least one node that is one-hop neighbor of both x and y.

Broadcast neighborhood: The broadcast neighborhood of a node, x, is the set of all one-hop neighbors and two-hop neighbors of node x. When node x broadcasts a safety message, a transmission collision occurs iff another node member of the broadcast neighborhood of node x simultaneously broadcasts a safety message. It is to be noted that in a vehicular environment, the broadcast neighborhood of each node dynamically changes due to vehicle mobility.

Figure 7:
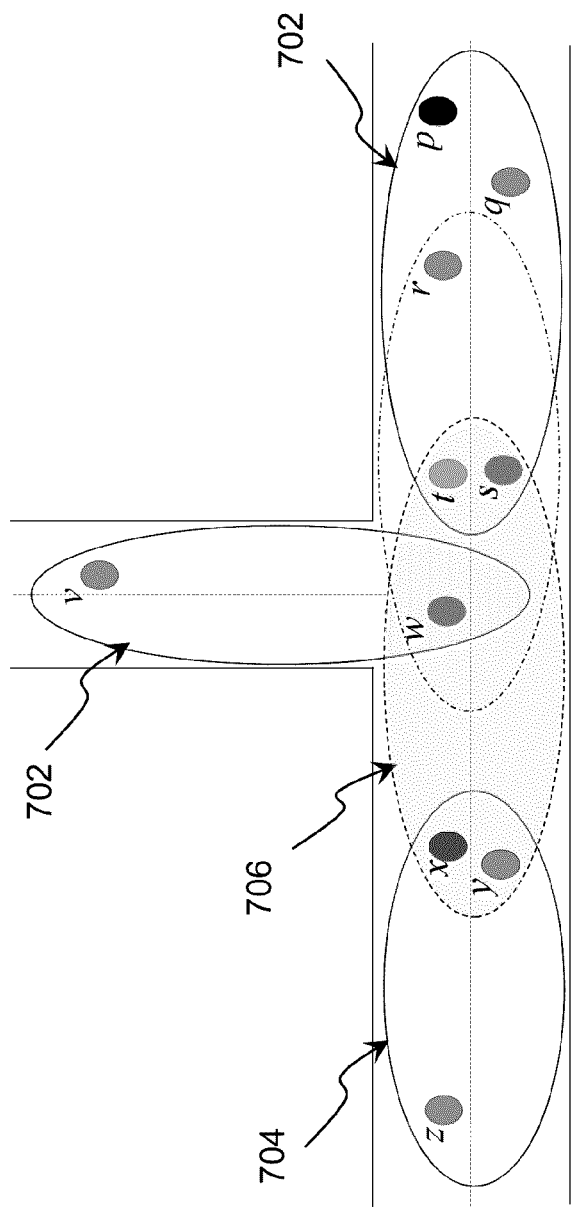
FIG. 7 is a diagram showing nodes in broadcast neighborhoods.

This is illustrated in FIG. 7. A group of nodes is circled by an ellipse 702 iff all the nodes are one-hop neighbors. Thus, nodes x, y, z are all one-hop neighbors 704 of each other, but nodes v and x are not one-hop neighbors because they are separated apart by a distance larger than the threshold and cannot directly exchange safety messages. However, nodes v and x are two-hop neighbors because they share a common one-hop neighbor node w. Similarly, nodes w and z are two-hop neighbors because they share a one-hop neighbor x (and node y, too). All nodes shown in FIG. 7 are in the broadcast neighborhood of node w, because each of them is either a one-hop neighbor or a two-hop neighbor of node w. Indeed, all nodes shown in FIG. 7 are in the broadcast neighborhood of any of the nodes in the shaded neighborhood 706.

Now, return to FIG. 6. At the end of each time slot, usages of all previous S time slots are updated. The node will update this usage information and record identities of all nodes in its one-hop neighborhood seen during the previous S time slots (step 660). This time slot usage information will be used by the node for selecting main time slots and secondary time slots, and also will be broadcast to other neighboring nodes to exchange this time slot usage information. The next time slot then starts and the process is repeated.

These steps of process 600 are now described in further detail.

First, a time division scheme is established and applied to the MBH layer 206 (step 610). Applying a time division scheme and allocating time slots appropriately allow a node to access only time slots that are not allocated to any other nodes in its broadcast neighborhood. In a time division scheme, time is divided into frames, and each frame is further divided into a fixed number, S, of time slots, which may have an equal and constant duration. As shown in FIG. 3, in a time unit, between the start of the time unit 302 and the end of the time unit 304 (the same as the start of the next time unit), the time unit is partitioned into multiple time frames 306. Within each frame 306, between the start time 308 of the frame and the end time 310 of the frame (or the beginning of the next frame), there is partitioned an integer number of time slots 312. Each time slot may be of a constant time interval, though this is for convenience only and not required. The slot duration generally should be large enough, i.e., sufficiently long for the safety messages to be transmitted, to ensure that, when a safety message is sent by the MBH layer of a node at the start of a time slot, the message is completely transmitted over the air before the start of the next time slot. This condition eliminates the safety message queueing at the MAC layer and prevents any channel contention or simultaneous transmission among nodes accessing different time slots at their MBH layers.

For a distributed network, with no central controller, in order to achieve proper operation of the MBH layer across all nodes, it is important that the time frames and times slots of all nodes are synchronized. That is, all the nodes need to be slot-synchronized. At any time instant, each node should correctly determine the index of the current time slot within a frame, where the index starts from 0 to S−1. This can be done by synchronizing to a common external time reference. Any suitable external reference may be used. For applications intended for a more confined area, such as a warehouse, it may be possible to provide this common reference through Wi-Fi™ or some other ground-based radio signal source. For more general application, such as open roads, a common time reference source, such as that provided by the Global Positioning System (GPS) time standard, may be suitable because it is reasonable to assume that each node is equipped with a GPS module. In the following, GPS signals will be used in the examples, though it will be appreciated that the external common time reference source may be provided in any suitable manger. Once synchronized, the time division scheme is common to all nodes.

Synchronization may be performed by using the GPS one-pulse-per-second (1 PPS) signal as a common time reference for all nodes. For example, according to one implementation, each GPS second is partitioned into an integer number, F, of frames indexed from 0 to F-1. The number of frames per second, F, is selected to be an integer in order to simplify slot-synchronization.

Figure 8:
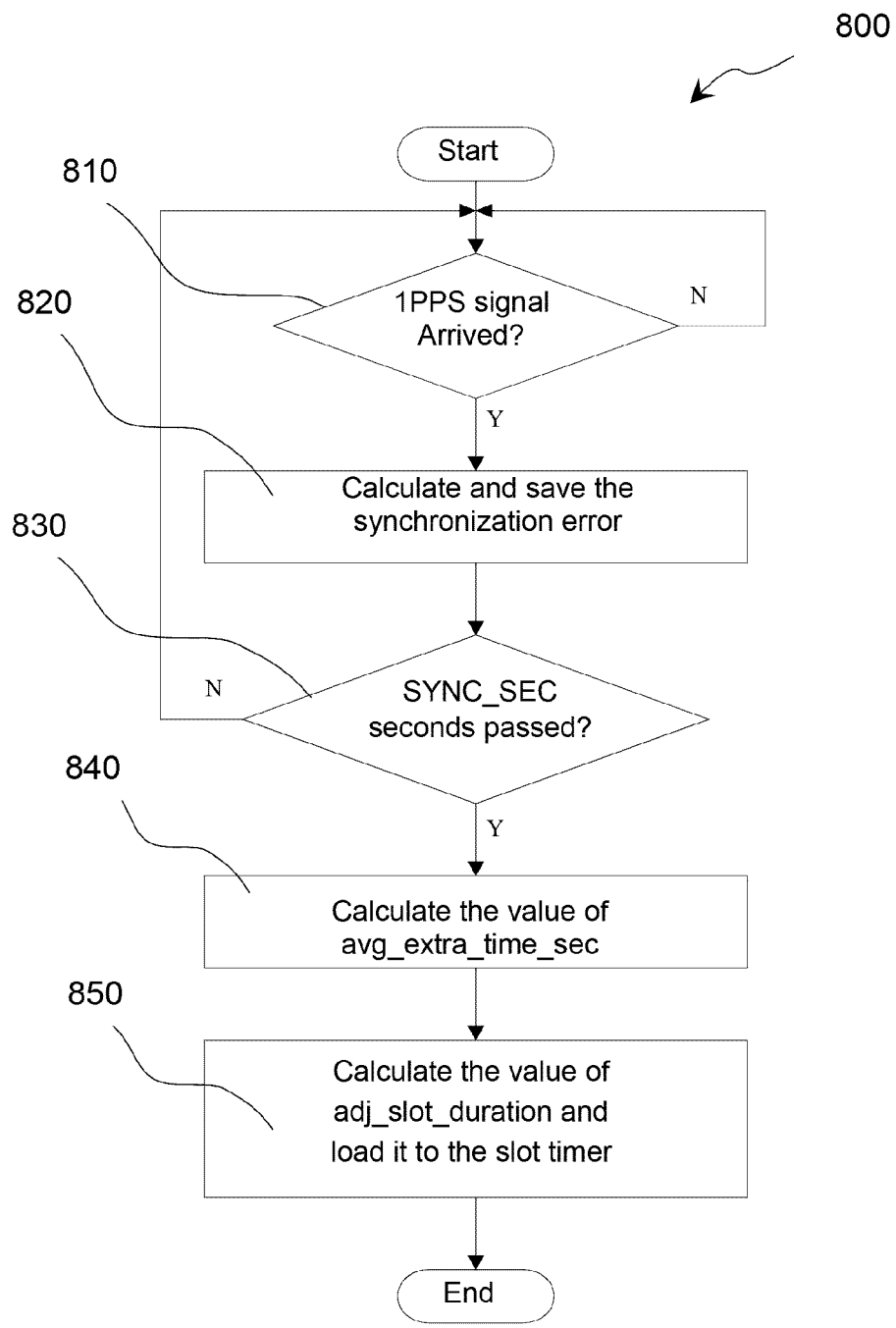
FIG. 8 shows a flow chart that illustrates a slot-synchronization setup procedure.

Reference is now made to FIG. 8, which shows a flow chart that illustrates a slot-synchronization setup procedure 800. A node may use an on-board device 500 that includes a microprocessor 510 with timer 518 (providing timer or clock signals) and external interrupt capabilities, and a GPS receiver 512, which provides a 1 PPS signal for slot-synchronization, to implement this process. To achieve slot-synchronization, a slot timer is used to indicate the end of the current time slot. The 1 PPS signal is used to restart the slot timer at the start of each GPS second, in order to eliminate any synchronization error which occurred in the previous second as further described below.

Synchronization error may occur in the duration of one second due to, e.g., microprocessor clock inaccuracies, accumulated from synchronization errors in each time slot, which may become too large as to affect the MBH operation (e.g., causing incorrect indexing of some time slots). Restarting the slot timer at the start of each GPS second helps eliminate this error and prevent it from propagating to the next GPS second. The slot-synchronization setup procedure also has the objective to ensure that the synchronization error in the duration of one second, i.e., between two successive adjustments of synchronization error, remains much smaller than the duration of one time slot, by correcting these synchronization errors periodically.

According to this procedure, one waits for the start of a time unit, i.e., arrival of 1 PPS signal (step 810) and then calculates the average synchronization error (step 820) that is predicted to be introduced by the processor timer in the duration of one second, i.e., between the arrival times of two successive 1 PPS signals. After a specified integer number of seconds, denoted by SYNC_SEC, has passed (step 830), an average synchronization error per second is calculated over the specified integer number of seconds, i.e., SYNC_SEC, and stored in a variable denoted by avg_extra_time_sec (step 840). The avg_extra_time_sec value is positive (negative) when the processor timer counts faster (slower) than the speed required for a perfect synchronization with the 1 PPS signal; and the absolute value of avg_extra_time_sec depends mainly on the manufacturing error in the nominal value of the processor clock frequency. Given the value of avg_extra_time_sec, an adjusted slot duration is calculated and the slot duration defined for the processor, denoted by SLOT_DUR, is adjusted such as to compensate for the average synchronization error (step 850), i.e., $$\mathrm{adj\_slot\_dur} = \mathrm{SLOT\_DUR} - \frac{\mathrm{avg\_extra\_time\_sec}}{\mathrm{NUM\_SLOT\_SEC}}. \quad (1)$$

where adj_slot_dur and NUM_SLOT_SEC denote the adjusted slot duration and the total number of time slots per second, respectively. In this way, if the processor timer is faster (slower) than required, the SLOT_DUR value is increased (decreased) by the amount of |(avg_extra_time_sec)/(NUM_SLOT_SEC)|, which compensates for the average extra (less) time that the processor timer calculates per second as a result of the manufacturing error in the processor clock frequency. The slot timer is loaded with the adj_slot_dur value ready for the start of the MBH operation in each time slot, as will be further described below.

Now return to FIG. 6. After time is partitioned and time slots synchronized, the time division provided at the MBH layer is utilized for subsequent operations, the first of which is to allocate or acquire a main time slot (step 620) and secondary time slot(s) (step 630) for the node.

One function of the MBH layer is time slot allocation, which allows a node to avoid transmission collisions by transmitting only over the time slots that are not accessed by other node members of its broadcast neighborhood. The time slot allocation scheme is applied by each node to acquire its main time slot or any additional time slot in a time frame to perform the MBH layer operations. The time slot allocation scheme allows each node to be always aware of the set of available time slots in a frame, properly select an available time slot to access, detect if another member of its broadcast neighborhood attempts to access the same time slot, and resolve this multiple slot access issue whenever detected. These operations are achieved in a distributed way, i.e., without the need of a central controller.

As noted earlier, a node may, through the wireless signal transceiver 514 of its on-board device, broadcast its BSMs and control information in a main time slot allocated to the node and broadcasts other safety messages, if any is generated or needs to be relayed, in one or more secondary time slots. Associated with each type of safety messages, there is an associated type of MPDU. Therefore, there are two types of MPDUs: primary or main MPDU and secondary MPDU. The main MPDU is transmitted over a node's main slot and carries a node's BSM if it is ready for transmission. On the other hand, the secondary MPDU is transmitted over additional time slots assigned to a node, for broadcasting its other (non BSM) types of safety messages or relaying multi-hop messages received from its one-hop neighbors.

These two types of MPDUs may be structured similarly. FIG. 9(a) shows the structure or format of an example for holding the primary MPDU. FIG. 9(b) shows the structure or format of an example for holding the secondary MPDU. MPDU control field in the main MPDU and the secondary MPDU may be structured in the same way, as shown in FIG. 9(c), which is an example of structure or format for holding values of MPDU control field. As can be seen in FIG. 9, the chief difference between the formats of the two MPDU types is in the information contained in the header.

FIG. 10 is a table showing the definition and length of each field in the main and secondary MPDU headers. The length of a node ID may be set to four bytes, similar to the length of the vehicle temporary ID included in a BSM, as defined in the SAE J2735 standard. For a given length of message ID, the message ID counter will cycle through all possible values limited by the length and reset when the counter overflows. It should be sufficiently long to provide sufficient time for the message ID counter to overflow. For example, if the length of message ID is set to one byte, it would provide sufficient time for the message ID counter to overflow, e.g., 25.6 seconds for a safety message generation rate of 10 Hz. The time-to-live (TTL) field, which is a counter, specifies the remaining number of hops that a safety message still needs to propagate. The symbol H denotes the maximum number of hops allowed for a safety message to propagate. The TTL field is set by the source node of a message, starting from a number that is less than or equal to H, and decremented by each node that relays the message by a constant number, such as 1, until it reaches a low threshold, such as 0 (for a single-hop broadcast message, the TTL field is originally set to 0). For an easier implementation of the MBH layer, the length of the MPDU control field may be set to an integer number of bytes. For example, if the TTL field consists of four bits, two bits can be added to the MPDU control field resulting in a total length of one byte (the additional bits can be reserved for future use). The same applies for the Tx slot and Tx frame fields, which are used for multiple slot access detection.

The header of the main MPDU includes the number of one-hop neighbors of the transmitting node and its time slot usage bitmap 400, which need to be broadcast to the node's one-hop neighbors once in each frame, in order to determine which time slots are available to access or decide whether or not to relay a multi-hop broadcast message. Unlike in the header of the main MPDU, the header of the secondary MPDU includes a field that indicates the ID of the source node s that originally broadcast the carried safety message. This field does not exist in the header of the main MPDU, since the main MPDU is used to broadcast only the BSMs generated by the transmitting node (not to relay messages received from other nodes), i.e., the source node ID is always the same as the transmitting node ID, which is already included in the header. Other than this difference, the formats of the two MPDU types can be structured the same way and contain the same type of data.

Having described the details of the main and secondary MPDUs and their respective headers, a time slot allocation scheme is next described in detail. This time slot allocation scheme may be used for allocating both the main time slot, i.e., the time slot for main MPDU of a node (step 620), and for allocating the secondary time slot(s) (step 630), i.e., time slot(s) for secondary MPDU(s), if necessary, though some modification to allocate secondary time slot(s) may be necessary, for example, when deciding whether to allocate a time slot for relaying a multi-hop message.

Figure 11:
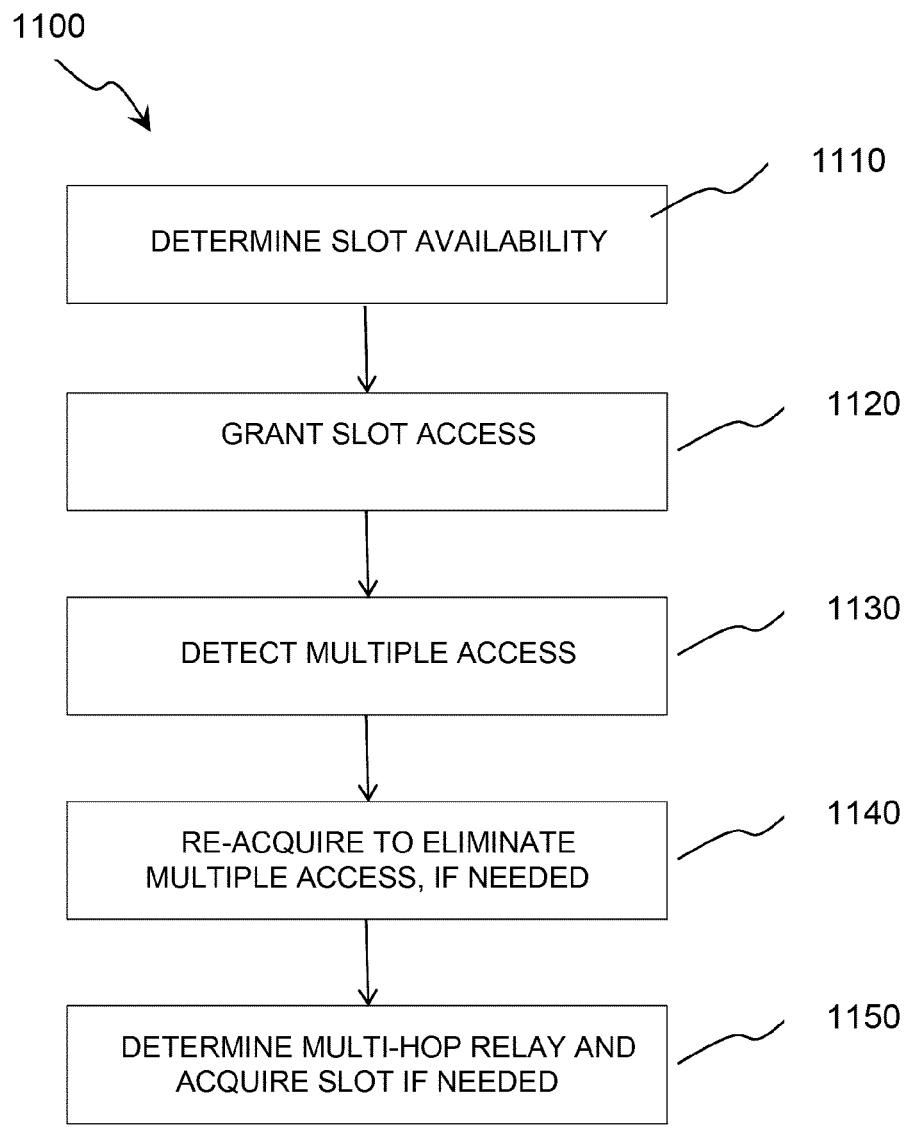
FIG. 11 is a flow chart illustrating a process of implementing a time slot allocation scheme.

Reference is now made to FIG. 11, which shows a flow chart of a time slot allocation scheme. This time slot allocation scheme generally applies to both allocation of main slot and allocation of secondary slot. In some of the steps, the details of carrying out the steps may differ due to the differences between the main MPDU and the secondary MPDU, They will be further explained in detail.

First, it is necessary to determine slot availability (step 1110).

When a node, x, is just powered on, after conducting the synchronization procedure using the GPS 1 PPS signal, node x should determine the set of time slots that it can access, in order to acquire its main slot and start broadcasting main MPDUs. Hence, node x first waits for the duration of one complete frame, i.e., S successive time slots. By the end of this initial wait period, node x can construct a set, $N_x$, which includes the ID of each one-hop neighbor from which node x has received a main MPDU in the previous S time slots (recall that, each node must broadcast a main MPDU once in each frame). The main MPDU received from each one-hop neighbor $y \in N_x$, includes the slot bitmap, $B_y(i)$, which indicates the availability of each time slot i=0, . . . , S-1, as seen by node y. Consequently, if the slot bitmap received from each one-hop neighbor $y \in N_x$ indicates that a specific time slot is idle, node x can access this time slot since it is not currently used by any member of node x's broadcast neighborhood. In other words, a time slot, i, is available for node x to access iff $B_y(i)=0$ for each one-hop neighbor $y \in N_x$. Hence, node x can determine the set of available time slots, denoted by $A_x$, and continuously modify it based on the slot bitmaps associated with the $N_x$ set, which is updated after each time slot.

Next, a time slot (or more if required) is acquired by the node, i.e., slot access is granted to the node (step 1120).

Following the synchronization procedure and the initial wait period, a node randomly selects its main slot, which may be done in any suitable manner, such as sequentially or according to any appropriate algorithm. In this example, the main slot is selected using random sampling, such as simple random sampling, from the set of available time slots, $A_x$. Once the main slot is selected, the node keeps acquiring this slot by broadcasting a main MPDU in each frame, unless a multiple slot access is detected. A multiple slot access is the undesired situation of having multiple one-hop neighbors or two-hop neighbors simultaneously accessing the same time slot. Why such a situation happens and how it is detected is explained later. If a node detects a multiple slot access on its main slot, the node releases this slot and acquires another main slot from the $A_x$ set. Similarly, in order to access any additional time slot in a frame, a node follows the same procedure applied to (re)acquire its main slot, i.e., simple random sampling from the $A_x$ set. Of course, it is necessary to determine first if the node has any secondary safety messages to transmit (i.e., non-BSM safety messages generated by the node for transmission or safety messages received from the node's one-hop neighbors to be relayed by the node) and once it can be determined, or affirmed, that there are secondary safety messages among the safety messages to be transmitted, the corresponding secondary slot or slots will be acquired for the secondary safety messages. The only difference between accessing the main slot acquired at step 620 and an additional slot, i.e., secondary slot acquired at step 630, by a certain node is that, the additional time slot is released if there is no payload message requiring transmission, unlike the main slot, which a node keeps accessing in each frame regardless whether or not a BSM is ready for broadcast. Similar to the main slot, an additional time slot is also released when a multiple slot access is detected, as described in the following.

Next, it is necessary to detect multiple access (step 1130), i.e., simultaneous access to the same slot by multiple nodes.

Based on the time slot access scheme described herein, it is possible that a node and other members of its broadcast neighborhood simultaneously access the same time slot, resulting in a situation referred to as multiple slot access. Multiple slot access can happen if multiple one-hop neighbors or two-hop neighbors simultaneously select to transmit over the same time slot, as a result of the simple random sampling from the set of available time slots, either for main slot acquisition or for additional slot access. Also, multiple slot access can occur due to node mobility. For instance, if a node, x, and another faraway node, y, which are accessing the same time slot (since they are neither one-hop neighbors nor two-hop neighbors), approach each other, a multiple slot access will happen once node y becomes member of the broadcast neighborhood of node x. In case of a multiple slot access between nodes x and y, the MBH layer of each node simultaneously pushes an MPDU to the WSMP entity, resulting in channel contention at the MAC layer.

Therefore, multiple access will need to be eliminated. Otherwise, transmission collision will occur. If multiple access is detected, it will be necessary for one (or both) node to re-acquire a time slot in order to eliminate the detected multiple access. This elimination of multiple access (step 1140) is performed at the MBH layer. To explain how to detect and eliminate multiple slot access, in the following, consider that the MBH layer of nodes x and y simultaneously access time slot i in time frame j.

The following two scenarios are used below to explain the detection and elimination of multiple slot access. First, the channel contention is resolved by the IEEE 802.11p entity, leading to successful over-the-air transmissions of both MPDUs, in which case one of the two MPDUs may be transmitted over a time slot that is different from the one intended by the MBH layer. Second, the channel contention at the MAC layer is unresolved, causing a transmission collision of both MPDUs.

The first case of multiple slot access, which results in successful transmission of both MPDUs of nodes x and y, is detected by node x (and likewise by node y) when it successfully receives the MPDU broadcast by node y, indicating in its header that Tx slot=i and Tx frame=j. In that case, since the MBH layer of node x is aware that it accessed the same time slot in the same frame, it concludes that a multiple slot access happened and was resolved at the MAC layer. Consequently, node x releases time slot i and acquires another time slot (if needed) iff $ID_x<ID_y$, where $ID_y$ is obtained from the Tx node ID field in the header of the MPDU transmitted by node y. This condition forces "only one" of the two nodes to release time slot i, since there is no need to let both nodes release the time slot and contend to acquire another available time slot, which may produce further multiple slot access events, especially in high node density scenarios.

The second case of multiple slot access, which leads to a transmission collision of the MPDUs of nodes x and y, is detected by both nodes from the slot bitmaps 400 received in the S−1 time slots following time slot i. That is, if node x receives a main MPDU from a one-hop neighbor $z \in N_x$ indicating that $B_z(i)=0$, node x concludes that its previous MPDU transmission over time slot i has collided at node z. In other words, when node z indicates that $B_z(i)=1/0$, that is considered as an ACK/negative ACK (NACK) of receiving an MPDU broadcast over time slot i. Hence, based on the received NACK, $B_z(i)=0$, node x releases time slot i and acquires another time slot (if needed) from the set of available time slots, $A_x$. Note that, this technique may lead to a false multiple slot access detection if the main MPDU broadcast by node z, from which node x detected the multiple slot access, is the first MPDU exchanged between the two nodes (when they just become one-hop neighbors). The reason is that, the slot bitmap included in this firstly exchanged MPDU may indicate that $B_z(i)=0$, since node z has not yet received any MPDU from node x, including the MPDU broadcast by node x over time slot i. Therefore, node x will detect a multiple slot access, regardless whether or not it actually happened. To deal with this issue, the first main MPDU received from a node should not be considered for multiple slot access detection. Without this condition, when two nodes become one-hop neighbors, whichever node transmits its main MPDU first, the other node will detect a multiple slot access and release at least its main slot. The previous condition is equivalent to requiring node x to consider a multiple slot access indicated by the slot bitmap in a main MPDU received from node z iff $z \in N_x$, provided that the multiple slot access detection procedure is performed before updating the $N_x$ set at the end of each time slot.

As described earlier, secondary MPDUs include secondary MPDUs carrying safety messages generated by a node's own safety application layer 204, and secondary MPDUs carrying multi-hop safety messages. Time slot(s), if required, will need to be allocated as well. The next step is therefore to determine if any multi-hop relay is required and, if so, allocate time slot(s) for relay the multi-hop safety message(s) (step 1150). This step is described in further detail below.

The MBH layer provides multi-hop broadcast service, which allows a source node to deliver a safety message not only to its one-hop neighbors (as previously discussed), but also to all the nodes located within a specified number of hops, as determined by the source node in the TTL field of the MPDU carrying the message. The multi-hop broadcast service exploits the ACKs/NACKs provided by the slot bitmaps in the received main MPDUs, together with the location information of one-hop neighbors, to allow a safety message to reach all the intended receivers by using a small number of relay nodes, as described in the following.

Neighbor Information Management: To realize the proposed multi-hop broadcast scheme, each node should be aware of the location of each of its one-hop neighbors. For this purpose, when the MBH layer receives a main MPDU carrying a BSM (as detected from the BSM bit in the MPDU header), the BSM is decoded to extract the position information of the transmitting node, i.e., the longitude, latitude, elevation, and position accuracy, which must be contained in the mandatory part of the BSM. This position information is associated with the Tx node ID in the MPDU header and included in a neighbor information base (NIB) maintained by the MBH layer. Alternatively, instead of having the MBH layer to decode each received BSM, another approach to construct the NIB is to pass the encoded BSM to the application layer, which acknowledges the BSM receipt by sending to the MBH layer (in the management plane) the position information included in the BSM after decoding it. This approach is preferred since it reduces the MBH processing time by eliminating the BSM decoding procedure.

Message Relaying Conditions: Consider that the MBH layer of a node, x, receives an MPDU from its one-hop neighbor y, on time slot i, with the TTL field equal to k, where k>0, indicating that the message carried by the MPDU needs to propagate for k more hops. Hence, node x should decide whether or not to rebroadcast the received message. Let set $Z_x$, where $Z_x \subset N_x$, denote the set of IDs of the one-hop neighbors of node x that did not receive the message broadcast by node y. Node x does not rebroadcast the message if one of the following conditions holds:

a) Node x has previously received the same message;
b) $Z_x=\varphi$;
c) $\exists w \in N_x \backslash Z_x$, such that $Z_x \subseteq N_w$ and $|N_w|>|N_x|$, where $|\bullet|$ denotes the cardinality of a set; or
d) $\exists w \in N_x \backslash Z_x$, such that $Z_x \subseteq N_w$, $|N_w|=|N_x|$, and $ID_x<ID_w$.

These four conditions are now described in detail below.

The first condition, i.e., condition a), drops a message that node x has previously received and already decided whether or not to rebroadcast. To check the three other conditions, node x needs to estimate the $Z_x$ set. Hence, after receiving the MPDU from node y on time slot i, nose x waits for the duration of S−1 time slots to receive the slot bitmaps from all its one-hop neighbors. Then, node x determines set $Z_x$ as follows: $Z_x=\{v \in N_x: B_v(i)=0$ or $B_v(i)=1$ and $d(y,v)>\zeta\}$, where $d(y,v)$ denotes the distance between node y and another node $v \in N_x$, which can be calculated from the locations of both nodes stored in the NIB of node x. That is to say, node x decides that its one-hop neighbor, v, has received the message broadcast by node y on time slot i, i.e., $v \notin Z_x$, iff node v acknowledges that it has successfully received a message on time slot i by setting $B_v(i)=1$, and the inequality $d(y,v)\leq\zeta$ is satisfied, indicating that nodes v and y are one-hop neighbors, i.e., the message received by node v is actually from node y, not from another node that is also accessing time slot i. After determining set $Z_x$, node x can check if any of conditions b) to d) holds.

Consider now the second condition, i.e., condition b). If this condition holds, i.e., if all one-hop neighbors of a node x have received the same message, node x will not rebroadcast the message.

If this condition does not hold, the third condition, i.e., condition c) is checked. This condition checks if node x has a one-hop neighbor that i) already received the message, ii) can reach all the node members of the $Z_x$ set, and iii) has a larger number of one-hop neighbors as compared to node x, i.e., has a chance of delivering the message to a larger number of nodes. If so, this condition will allow node x not to rebroadcast the message.

To check condition c), recall that node x is aware of the number of one-hop neighbors, $|N_w|$, for each node $w \in N_x$, since this information is included in the header of the main MPDU broadcast by node w. Also, in order to check if $Z_x \subseteq N_w$, node x can apply an approach similar to the one used to determine the $Z_x$ set. That is, for a certain node $w \in N_x \backslash Z_x$, a node $z \in Z_x$ satisfies $z \in N_w$ iff $d(z,w) \leq \zeta$ and $B_z(j)=1$, where j is the index of the main slot of node w, which is known to node x. Note that, $Z_x \subseteq N_w \Longleftrightarrow Z_x \subseteq Z_w \Longrightarrow |Z_x| \leq |Z_w|$, by definition of the $Z_w$, $Z_x$, and $N_w$ sets. Consequently, when $Z_x \subseteq N_w$ is satisfied in condition c), node x does not rebroadcast the message if $|N_w|>|N_x|$, indicating that there is a chance of also having $|Z_w|>|Z_x|$, thus allowing node w to possibly deliver the message to a larger number of nodes that did not receive it, as compared to node x, while still reaching all the node members of the $Z_x$ set.

Finally, the fourth condition, condition d), is to deal with the situation when n one-hop neighbors, $k_1, k_2, \ldots, k_n$, with equal $Z_{ki}$ sets and $N_{ki}$ set cardinalities $\forall i$ have conditions a) and b) unsatisfied and check for condition c). This situation will result in having all the n nodes unnecessarily rebroadcasting the message, since condition c) as well will not be satisfied for any of the nodes. In that case, condition d) ensures that the node with the largest ID value is the only one to rebroadcast the message.

Based on conditions a) to d), if a node decides to rebroadcast the message, the node reserves an available time slot, i.e., allocate an additional secondary time slot, includes the message in a secondary MPDU and transmit it over the reserved time slot. This procedure, utilizing conditions a) to d), is further described in reference to FIG. 7.

In FIG. 7, there are shown several nodes, and several one-hop neighbors. A group of nodes is circled by an ellipse 702 iff all the encircled nodes are one-hop neighbors.

Assume that node p broadcasts a multi-hop message to its one-hop neighbors, q, r, s, and t, with the TTL field equal to two. By applying condition b), node q will not rebroadcast the message, since $Z_q=\varphi$. Similarly, by applying condition c), node r will not rebroadcast the message as $Z_r=\{w\} \subset Z_s=Z_t=\{w,x,y\}$. Then, since $Z_s=Z_t$ and $|N_s|=|N_t|=7$, condition d) will let either node s or node t rebroadcast the message (without this condition, both nodes would have rebroadcast the message), depending on which node has a higher ID value; assume it is node s. When node s rebroadcasts the message, nodes q, r, and t will discard it by applying condition a), since the same message has been previously received from node p. Hence, among the one-hop neighbors of node s, node w will rebroadcast the message, since $Z_w=\{v\}$ is not a subset of the $N_k$ set for any node $k \in N_w \backslash Z_w=\{x,y,s,t\}$. Also, only one of the two nodes x and y will rebroadcast the message, by applying condition d), similar to the case of nodes s and t. Finally, when the message reaches nodes v and z, the TTL field is equal to zero as it has been decremented by one before each rebroadcast, and the message does not propagate further.

As mentioned, when a node, x, receives a message that requires multi-hop transmission, node x waits for the duration of S−1 time slots to determine the $Z_x$ set and apply conditions a) to d). Hence, for each additional hop that a message propagates after it is first broadcast, an average delay of around 1.5 times the frame duration is needed by each relay node that rebroadcasts the message: S−1 slots to make a decision whether or not to rebroadcast the message and an average of (S+1)/2 slots to wait for an available time slot and transmit the message. If faster multi-hop propagation is required, it is possible to decrease the 'per hop' delay to (S+1)/2 slots and eliminate the wait period of S−1 slots, at the expense of a reduced reliability in calculating the $Z_x$ set by a node, x. That is, when node x receives a multi-hop broadcast message from another node, y, on time slot i, the $Z_x$ set can be determined based on the slot bitmaps received and stored by node x in the S−1 time slots 'preceding' time slot i as follows: $Z_x=\{v \in N_x: B_v(j)=0$ or $B_v(j)=1$ and $d(y,v)>\zeta\}$, where j is the index of the main time slot of node y. Here, the $Z_x$ set is based on the ACK/NACKs received from each node $v \in N_x$ in response to node y's previous transmission over its main slot, rather than node y's current transmission over time slot i, as explained before. In other words, if a node $v \in N_x$ has successfully received the previous transmission from node y over its main slot, node x assumes that node v has also successfully received the current transmission from node y over time slot i. The tradeoff between the reliability in calculating the $Z_x$ set and the delay required for node x to decide whether or not to rebroadcast a message can be adjusted by varying the wait period following time slot i, from 0 to S−1.

Reference is now made to FIG. 6 again. After the main time slot and secondary time slot(s) are allocated at step 620 and step 630, the node will deliver the spooled safety messages for broadcasting over their respectively allocated time slots (step 640).

Messages are delivered, or passed, by the MBH layer to the lower MAC layer for broadcasting. To implement the MBH layer, a node may use an on-board microprocessor with timer and external interrupt capabilities, and a GPS receiver, which provides a 1 PPS signal for slot-synchronization. There are two main procedures implemented at the MBH layer: slot-synchronization setup and MBH operation. These two procedures are executed by the microprocessor in that sequence. The slot-synchronization setup has been described above in reference to FIG. 8. The implementation of MBH operation is described below First, in order to deliver the messages for broadcasting, the messages will be suitably prepared, including prepare their header data. This is illustrated in FIG. 12.

Because of the differences in data format and data content between a primary safety message and a secondary safety message, first, it needs to determine whether the next message to deliver is a primary message or a secondary message (step 1210). A primary safety message may be a basic safety message or any selected type of messages that are periodically generated by a node for broadcast. To deliver a primary message, such as to include a primary safety message in a main MPDU, to the MAC layer for broadcasting, a main MPDU header is prepared, which also includes a BSM if ready for transmission. Accordingly, once it is determined that the next time slot is the node's main slot, the next step is to check if BSM is ready for transmission (step 1220). It then prepare a main MPDU with the BSM included, if the BSM is ready (step 1230), or prepare a main MPDU without the BSM, if not ready (step 1240). The MPDU is then sent to the WSMP entity (step 1250). On the hand, if the next time slot is not the node's main slot but is scheduled by the node to relay a received message or broadcast a 'non-BSM' message generated by the node's application layer (step 1260), then the message is included in a secondary MPDU, by preparing a secondary MPDU and scheduling it for transmission (step 1270). The prepared MPDU (in this instance, a secondary MPDU), is passed to the WSMP entity (step 1250), which is next passed to the MAC layer for transmission.

Each MPDU represents a service data unit (SDU) for the WSMP entity. In addition to the fields included in the MPDU header, other control information is passed to the WSMP entity in the management plane, i.e., not for over-the-air transmission as part of the MPDU, but for proper operation of the protocol stack under the MBH layer. Such information includes the total MPDU length, transmit power level, data rate, safety channel number, and user priority, which specifies which access category the MPDU will be mapped to by the IEEE 1609.4 entity, for example. Also, part of this management information is the provider service identifier (PSID), which is included in the WSMP header to allow the delivery of a safety message carried by an MPDU to the corresponding application layer at a receiver node.

Figure 12:
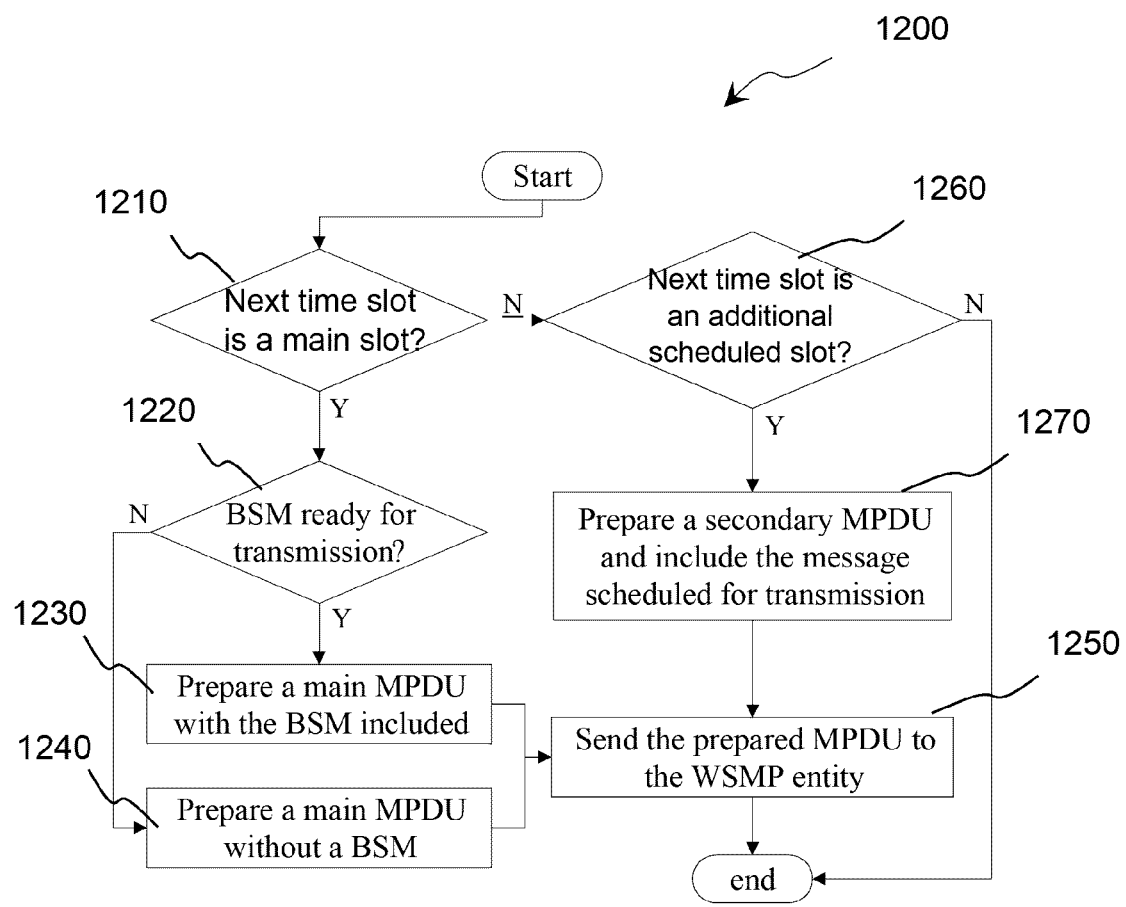
FIG. 12 is a flow chart illustrating a process of delivering safety messages implemented by the MBH layer.
Figure 13:
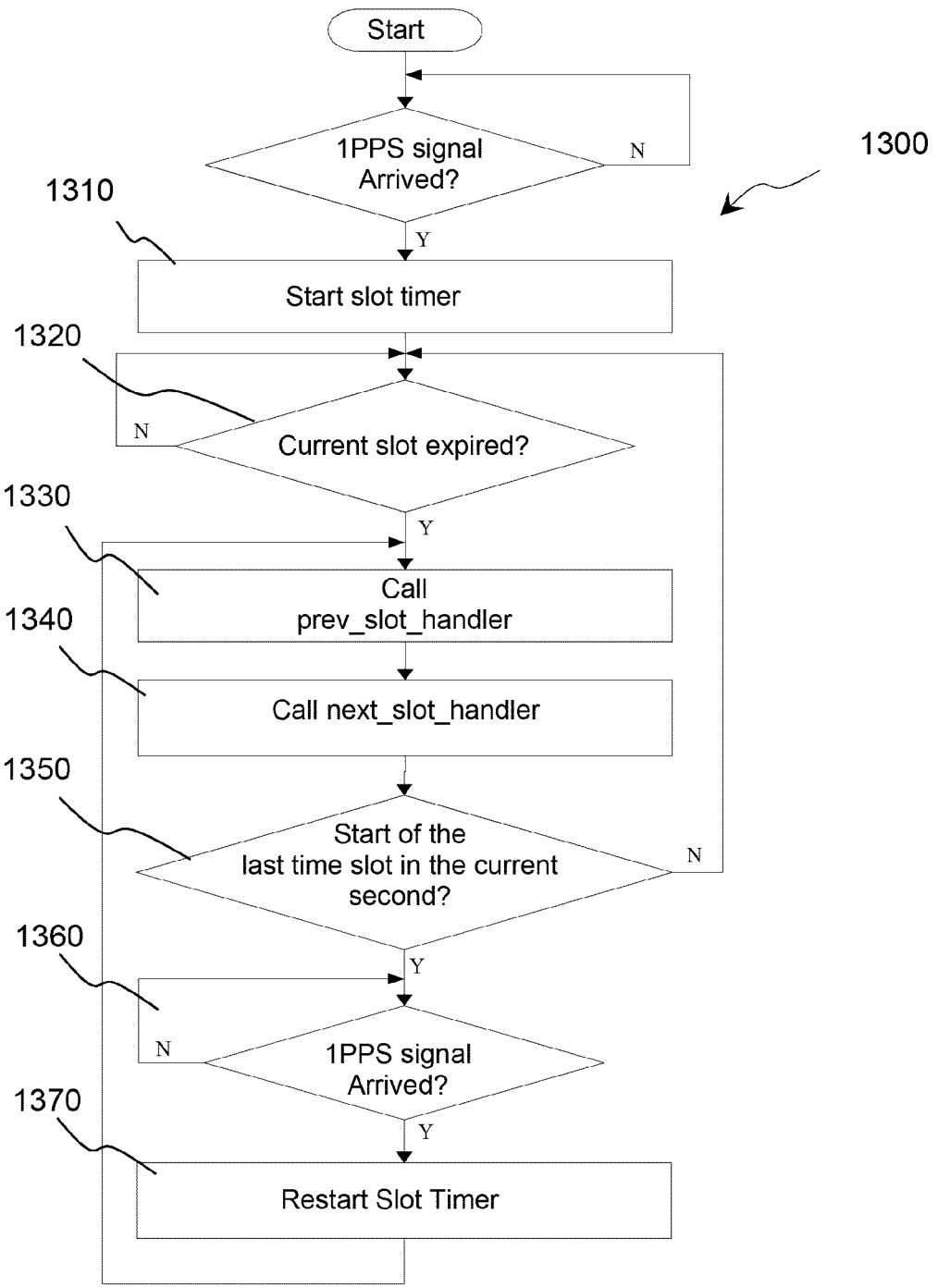
FIG. 13 is a flow chart illustrating an example of overall process of possible operations implemented in the MBH layer.

MBH operations include more than simply delivering safety messages as illustrated in FIG. 12. FIG. 13 provides a flowchart that includes other parts of the MBH operations. As will be clear, the MBH procedure 1300 requires many operations other than delivering safety messages, which is part of its next_slot_handler step. As illustrated in FIG. 13, after the completion of the slot synchronization setup procedure, the MBH operation begins by starting the slot timer (step 1310) at the first arrival of the 1 PPS signal. As described, the slot timer periodically indicates the end of a time slot, with a period equal to the adj_slot_dur value. Since the adj_slot_dur value is calculated in (1) to compensate for the average synchronization error per second, there likely exists a residual synchronization error calculated by the processor at each arrival of the 1 PPS signal. Hence, in order to prevent the accumulation of synchronization error, the error is eliminated each time the 1 PPS signal arrives, by restarting the slot timer. That is, when the last time slot in the last frame of a second starts, a node waits for the arrival of the 1 PPS signal in order to start the next time slot, i.e., the first time slot in the first frame of the next second. In this way, all the nodes are re-synchronized at the start of each GPS second, resulting in proper slot-synchronization, provided that the synchronization error done by the processor timer in the duration of one second, i.e., between two successive arrivals of the 1 PPS signal, is much smaller than the adj_slot_dur value. In case of a temporary loss of the GPS 1 PPS signal, e.g., when a vehicle is moving inside a tunnel, the slot-synchronization can be maintained solely based on the processor timer, i.e., without adjusting the synchronization error at the start of each second, for a certain time duration.

As shown in FIG. 13, at the end of each time slot (step 1320), two main functions are executed by the processor in sequence: prev_slot_handler (step 1330) and next_slot_handler (step 1340). The function next_slot_handler is to deliver a safety message if one is scheduled. One way of implementing a method of delivering a scheduled safety message is described in connection with FIG. 12 above. The procedure next checks if the next time slot is the last time slot in the current second (step 1350), in order to perform the synchronization error adjustment by restarting the slot timer (step 1370) using the 1 PPS signal (step 1360), as described above.

Figure 14:
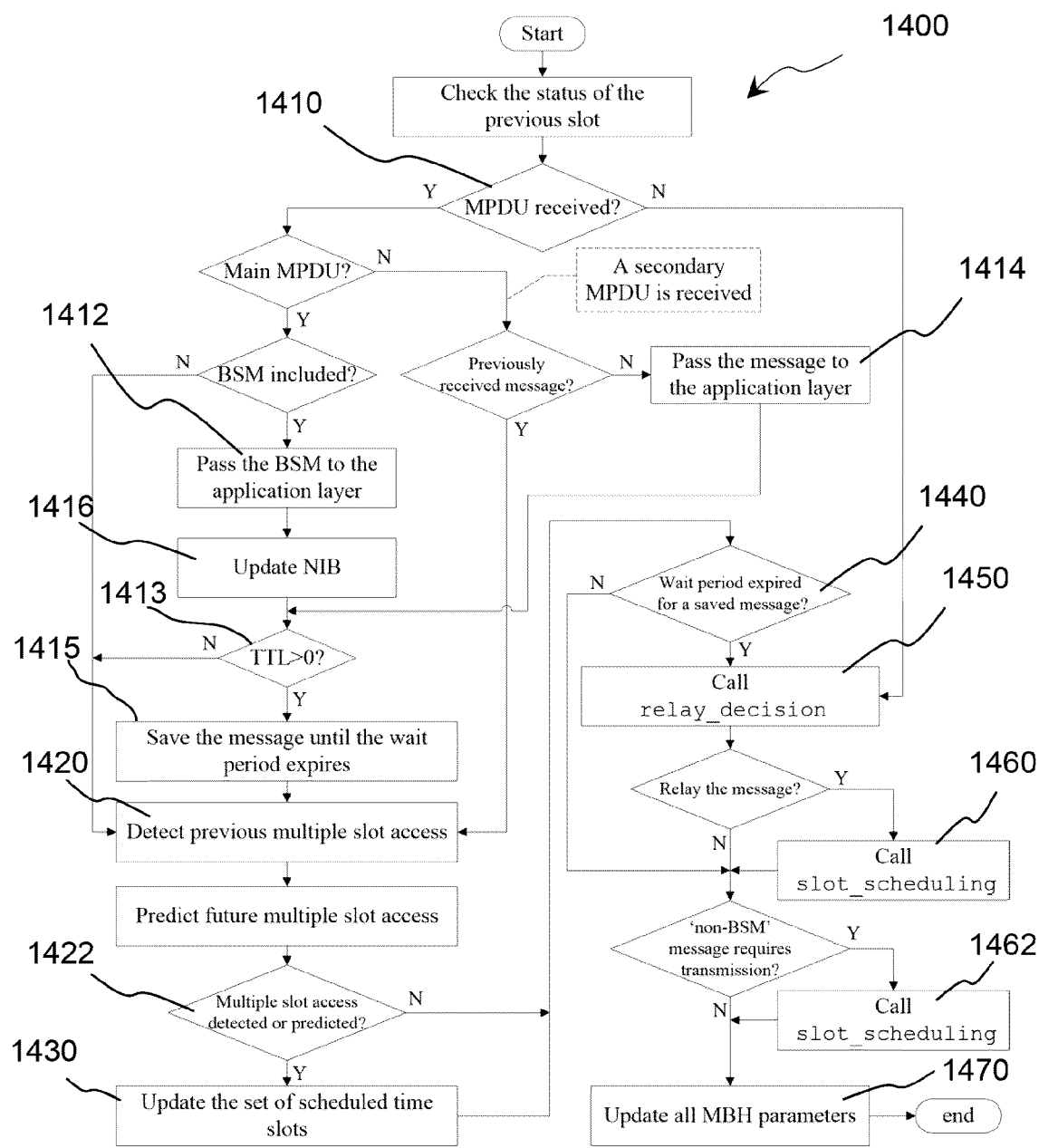
FIG. 14 is a flow chart illustrating the possible operations implemented in the MBH layer prior to delivering a safety message in a time slot.

A flowchart illustrating an example of the operation of the prev_slot_handler function is shown in FIG. 14. The operations in the prev_slot_handler function 1400 are to determine the status of the previous time slot, i.e., idle, sending, or receiving. If an MPDU is received during the previous slot (step 1410), the prev_slot_handler function performs the necessary operations to: a) receive the MPDU from the WSMP entity and pass the included safety message (if any) to the appropriate application layer entity based on the PSID in the WSMP header (step 1412 or step 1414), b) update the NIB if a BSM is received (step 1416), c) detect any multiple slot access on the time slots that the node has accessed in the previous S slots (step 1420), d) determine any possible future collision (step 1422) on the time slots that the node is planning to access (if a received MPDU indicates that one of these time slots became no more available), e) update the set of time slots that the node is accessing (step 1430) if necessary, e.g., after a multiple slot access detection or to avoid a future multiple slot access, and check the TTL field to determine if a received message requires multi-hop broadcast (step 1413) and, if so, save the message until a decision is made on whether or not to relay it (step 1415), after the specified wait period (e.g., S−1 time slots) expires. The wait period is checked in the prev_slot_handler function for each message that the node is waiting to decide whether or not to relay (step 1440), as shown in FIG. 14. If the wait period expires for a certain message, a relaying_decision function is called (step 1450) to apply the relaying conditions described earlier, i.e., one of the conditions a) to d). If the node decides to relay a message, a slot_scheduling function is called to schedule an available time slot for the node to rebroadcast the message (step 1460). The slot_scheduling function is also called if a "non-BSM" message is newly generated by the node's application layer and requires transmission (step 1462). Finally, the prev_slot_handler function updates all the MBH layer parameters (step 1470), such as the slot bitmap, set of one-hop neighbors, among others.

Various embodiments of the invention have now been described in detail. Those skilled in the art will appreciate that numerous modifications, adaptations and variations may be made to the embodiments without departing from the scope of the invention, which is defined by the appended claims. The scope of the claims should be given the broadest interpretation consistent with the description as a whole and not to be limited to these embodiments set forth in the examples or detailed description thereof.

What is claimed is:

1. A method of managing broadcasting of safety messages by a plurality of nodes in a broadcast neighborhood communicating with each other in a vehicular communication network, each of the plurality of nodes periodically broadcasting messages to other nodes, the method comprising, at a node of the plurality of nodes,
   establishing a time division scheme common to all nodes in the broadcast neighborhood for broadcasting messages, the time division scheme partitioning time into time frames and dividing each of the time frames into time slots,
   receiving application messages from one or more application modules executing at the node, the application messages including safety messages and non-safety messages,
   receiving safety messages from all other nodes in the broadcast neighborhood,
   providing a first module and a second module, the second module receiving safety messages from the application module and other nodes and managing broadcasting of safety messages, the first module receiving and managing broadcasting of non-safety messages bypassed the second module and passing all messages to a transceiver to broadcast,
   the second module, to manage broadcasting of one or more safety messages of the node in a time frame, the one or more safety messages including at least a primary safety message,
   spooling the one or more safety messages at the node,
   acquiring a main time slot for the primary safety message in the time frame,
   determining if the one or more safety messages including at least one secondary safety message, and acquiring at least one secondary time slot in the time frame corresponding to the at least one secondary safety message upon affirming presence of the at least one secondary safety message in the one or more safety messages,
   delivering the primary safety message at the beginning of the main time slot to the first module for broadcasting, the first module forwarding the primary safety messages to the transceiver to broadcast,
   delivering each of the at least one secondary safety message at the beginning of respective corresponding at least one secondary time slot to the first module for broadcasting, the first module forwarding each of the at least one secondary safety message to the transceiver to broadcast,
   recording time slots used by the safety messages received from all other nodes in the broadcast neighborhood,
   updating time slot usage in the time frame by all nodes in the broadcast neighborhood according to the main time slot and the at least one secondary time slot used by the node and the time slots used by the all other nodes, and
   storing the updated time slot usage by all the nodes at the node.

2. The method of claim 1, further including the step of releasing each of the corresponding at least secondary time slot upon completion of the delivering of the each secondary safety message.

3. The method of claim 1, wherein the primary safety message is a basic safety message (BSM).

4. The method of claim 3, wherein the secondary safety message is a non-BSM message.

5. The method of claim 1, wherein the first module is a medium access control (MAC) layer module and the second module is a message broadcast handling (MBH) layer module.

6. The method of claim 1, wherein the nodes are vehicles and road side units for relaying vehicular messages.

7. The method of claim 1, wherein either or both of acquiring the main time slot and acquiring the at least one secondary time slot include the steps of:
   identifying a time slot unallocated to any other nodes in the broadcast neighborhood,
   granting the node access to the unallocated time slot,
   detecting if the granted time slot being accessed by multiple nodes, and
   identifying another time slot and granting the node access to the other time slot if multiple access is detected.

8. The method of claim 7, wherein the updated time slot usage is stored in a matrix at the node, using intersection of a row and a column in the matrix to record time slot usage as determined by a one-hop neighbor node, wherein rows in the matrix correspond to one-hop neighbor nodes of the node and columns in the matrix correspond to time slots, and wherein the unallocated time slot is identified by identifying a column in the matrix that has no cell indicating usage by any node in the broadcast neighborhood.

9. The method of claim 8, further comprising:
   receiving a bitmap from each of the node's one-hop neighbor nodes, where each bitmap received by the node from a one-hop neighbor node, y, is storing time slot usage by one-hop neighbor nodes of the one-hop neighbor node y,
   for each of the node's one-hop neighbor nodes, and for each of S time slots in a sliding time window consisting of S consecutive time slots preceding and including the time slot, evaluating the bitmap corresponding to the one-hop neighbor node in the time slot and marking the time slot as busy if used in the bitmap, and
   updating each cell of the matrix as busy or not busy using the bitmaps received from all of the node's one-hop neighbor nodes.

10. The method of claim 7, the step of identifying the unallocated time slot further comprising:
    identifying more than one time slot unallocated to any other nodes in the broadcast neighborhood, and
    selecting one unallocated time slot using random sampling from the more than one unallocated time slot.

11. The method of claim 10, wherein the random sampling is simple random sampling.

12. The method of claim 1, wherein the updated time slot usage by all one-hop neighbors is stored in a bitmap at the node, the bitmap being updated after expiry of each time slot, k, to record whether or not each time slot in a sliding time window that consists of S consecutive time slots preceding and including time slot k is used by a one-hop neighbor for transmission, where k=0, ..., S−1, and S being the total number of time slots in a frame.

13. The method of claim 12, wherein the bitmap stored at the node is included in a main MPDU transmitted by the node over its main time slot, regardless whether or not the main MPDU is carrying a primary safety message.

14. The method of claim 1, wherein the primary safety message transmitted includes number of one-hop neighbors of the node in a header portion of the main MPDU carrying the primary safety message.

15. The method of claim 1, wherein the duration of each time slot is longer than duration required for transmission of any one of the safety messages.

16. The method of claim 1, wherein the common time division scheme is synchronized to a common external time reference signal.

17. The method of claim 16, wherein the common external time reference signal is a timing signal provided by one or more satellites in a Global Positioning System.

18. The method of claim 1, wherein delivering the primary safety message to the first layer comprising the further steps of:
checking if the primary safety message is ready, and
preparing a main MPDU to include the primary safety message if the primary safety message is ready.

19. The method of claim 18, wherein the main MPDU includes control information in its header.

20. The method of claim 18, wherein the main MPDU includes in its header an indication if the basic safety message is included.

21. The method of claim 1, further comprising the steps of:
identifying from the safety messages received from the other nodes multi-hop safety messages to be relayed by the node,
acquiring additional secondary time slots for the multi-hop safety messages to be relayed,
including the multi-hop safety messages to be relayed in the at least one or more secondary safety messages and including the additional secondary time slots in the corresponding at least one secondary time slots,
wherein delivering of the each of the at least one secondary safety message includes delivering the multi-hop safety messages to be relayed included in the at least one or more secondary MPDUs.

22. The method of claim 21, wherein each of the safety messages received from another node includes a counter, the counter being reduced by a constant number each time the each safety message is relayed and the relayed safety message is no longer included in the multi-hop safety messages to be relayed upon the counter being reduced to below a threshold.

23. The method of claim 21, wherein each of the safety messages received from the other nodes includes a message identification field and a node identification field to identify the source node s from which the received safety message originates, the step of identifying a received multi-hop safety message to be relayed including the further steps of:
determining if the received safety message $M_s(y)$ received from the other node y and originated from the source node s has been received at the node, and
not including the received safety message $M_s(y)$ in the multi-hop safety messages to be relayed if the safety message $M_s(y)$ has been received previously at the node.

24. The method of claim 23, wherein the step of identifying a received multi-hop safety message to be relayed including the further steps of, if the safety message $M_s(y)$ from the other node has not been received previously by the node:
determining from the time slot usage by all the nodes if the safety message $M_s(y)$ has been received previously by all the one-hop neighbor nodes, and
not including the safety message $M_s(y)$ in the multi-hop safety messages to be relayed if it has been received by all one-hop neighbor nodes previously.

25. The method of claim 24, wherein, if the safety message $M_s(y)$ from the other node has not been received by all the one-hop neighbor nodes previously, the step of identifying a multi-hop safety message to be relayed by the node x including the further steps of:
identifying a first set $Z_x$ of nodes comprising all one-hop neighbors of the node x that have not previously received the safety message $M_s(y)$,
identifying a second set of the one-hop neighbors of node x that have previously received the safety message $M_s(y)$,
for each member node in the second set, determining its one-hop neighbors that are member nodes in the first set $Z_x$, and
not including the safety message $M_s(y)$ in the multi-hop safety messages to be relayed if the node x has a one-hop neighbor in the second set that can reach all the member nodes in the first set $Z_x$ in one hop and has a larger number of one-hop neighbors as compared to the node x.

26. The method of claim 25, wherein, if the node x has a one-hop neighbor in the second set that can reach all the member nodes in the first set $Z_x$ in one hop and has the same number of one-hop neighbors that the node x has, the step of identifying a multi-hop safety message to be relayed by the node x including the further steps of:
determining the node identification number of the node x's one-hop neighbor in the second set, and
not including the safety message $M_s(y)$ in the multi-hop safety messages to be relayed if the node identification number is larger than that of the node x.

27. A device for managing broadcasting of safety messages by a node with a plurality of other nodes in a broadcast neighborhood communicating with each other in a vehicular communication network, each of the node and the plurality of other nodes periodically broadcasting messages to other nodes, the device comprising,
a wireless transceiver connected to an antenna for broadcasting and receiving messages,
a timing unit for receiving time synchronization reference signals,
one or more microprocessors including a first microprocessor having a timer, and having executing on the one or more microprocessors:
an MBH layer module executing on the first microprocessor, the MBH layer module receiving the time synchronization reference signals from the timing unit and timer signals from the timer to establish a time division scheme, which partitions time into time frames and divides each of the time frames into time slots, and receiving safety messages from the application module for spooling and broadcasting,
an application module, the application module receiving safety signals from at least one signal sensors and generating one or more safety messages in a time frame for broadcasting in accordance with the safety signals received from the at least one signal sensors, the one or more safety messages including at least a primary safety message, and a medium access control (MAC) module in data communication with the MBH module and the transceiver and forwarding messages from the MBH module to the wireless transceiver for broadcasting, and at least one memory device having stored thereon programming instructions to direct the one or more microprocessors to execute the MBH module, the application module, and the MAC module, wherein the MBH layer module, when executed on the first microprocessor, performs the steps of:

spooling the one or more safety messages at the node by storing the one or more safety messages temporarily on the at least one memory device, acquiring a main time slot for the primary safety message in the time frame, determining if the one or more safety messages including at least one secondary safety message, and acquiring at least one secondary time slot in the time frame corresponding to the at least one secondary safety message upon affirming presence of the at least one secondary safety message in the one or more safety messages, delivering the primary safety message at the beginning of the main time slot to the MAC layer for forwarding to the wireless transceiver broadcasting, delivering each of the at least one secondary safety message at the beginning of respective corresponding at least one secondary time slot to the MAC layer for forwarding to the wireless transceiver broadcasting, recording time slots used by the safety messages broadcast by all other nodes in the broadcast neighborhood, updating time slot usage in the time frame by all nodes in the broadcast neighborhood according to the main time slot and the at least one secondary time slot used by the node and the time slots used by the all other nodes, and storing in the one or more memory device the updated time slot usage by all the nodes at the node.

28. The device of claim 27, further comprising:

a matrix stored in the one or more memory device, the intersection of a row and a column in the matrix storing an indication of time slot usage by a node in the broadcast neighborhood, wherein the MBH layer module acquires the main time slot and the at least one secondary time slot uses the matrix to first identify an unallocated time by identifying a column in the matrix that has no cell indicating usage by any node and granting the node access to the unallocated time slot.

29. The device of claim 27, wherein the duration of each time slot established by the MBH module is longer than duration required for transmission of any one of the safety messages.

30. The device of claim 27, wherein the timing unit is a GPS receiver and the time synchronization reference signals is a timing signal received by the GPS receiver from one or more satellites in a Global Positioning System (GPS).

* * * * *